United States Patent
Gupta et al.

(10) Patent No.: US 11,159,604 B2
(45) Date of Patent: *Oct. 26, 2021

(54) PROCESSING AN OPERATION WITH A PLURALITY OF PROCESSING STEPS

(71) Applicant: Capital One Services, LLC, McLean, VA (US)

(72) Inventors: Tuhin Gupta, Hoffman Estates, IL (US); Prabhu Ranjith Kumar Koduri, Schaumburg, IL (US); Parameswaran V Vaidyanathan, Schaumburg, IL (US); Joji Thomas John, Hoffman Estates, IL (US); Ashwin Jacob, Schaumburg, IL (US); Siju Thomas, Hoffman Estates, IL (US); Kevin Gleaton, Lake Zurich, IL (US); Amit Singh, Prospect Heights, IL (US); Vivek Paul Chandrasekharan, Itasca, IL (US); Mithun Jose, Itasca, IL (US); Venkata Sudha Aluru, Buffalo Grove, IL (US); Manoj Pemmasani, Vernon Hills, IL (US); Justin Reid, Winfield, IL (US); Michael P. Newell, West Chicago, IL (US)

(73) Assignee: Capital One Services, LLC, McLean, VA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/438,860

(22) Filed: Jun. 12, 2019

(65) Prior Publication Data

US 2019/0373046 A1    Dec. 5, 2019

Related U.S. Application Data

(63) Continuation of application No. 16/000,190, filed on Jun. 5, 2018, now Pat. No. 10,362,097.

(51) Int. Cl.
*H04L 29/08* (2006.01)

(52) U.S. Cl.
CPC ............ *H04L 67/10* (2013.01); *H04L 69/326* (2013.01)

(58) Field of Classification Search
CPC ...... G06F 16/907; G06F 21/53; G06F 9/5072; G06F 9/542; G06F 9/546; G06F 9/547;
(Continued)

(56) References Cited

U.S. PATENT DOCUMENTS 7,702,724 B1 * 4/2010 Brydon .................. H04L 67/02
709/203
7,774,456 B1 * 8/2010 Lownsbrough ..... H04L 41/5083
709/224
(Continued)

OTHER PUBLICATIONS

Boner J., et al., "The Reactive Manifesto,", https://www.reactivemanifesto.org/, Sep. 16, 2014, 2 pages.
(Continued)

*Primary Examiner* — Christopher Biagini
(74) *Attorney, Agent, or Firm* — Harrity & Harrity, LLP

(57) ABSTRACT

A device may receive a request for an operation that includes a plurality of processing steps may identify metadata information. The device may determine a first processing step, and select a first microservice to call and a first transport protocol to utilize to call the first microservice. The device may call the first microservice, and may receive, from the first microservice a first output. The device may determine a second processing step, and select a second microservice to call and a second transport protocol to utilize to call the second microservice, wherein the second transport protocol is different from the first transport protocol. The device may call the second microservice, and may receive, from the second microservice, a second output. The device may
(Continued)

provide a response to the request based on the first output and the second output.

20 Claims, 12 Drawing Sheets

(58) Field of Classification Search
CPC ............. H04L 41/5051; H04L 41/5054; H04L 41/5096; H04L 67/02; H04L 67/10; H04L 67/108; H04L 67/16; H04L 67/20; H04L 67/2838; H04L 67/34; H04L 67/42; H04L 69/326

See application file for complete search history.

(56) References Cited

U.S. PATENT DOCUMENTS

| | | | | |
|---|---|---|---|---|
| 2002/0198984 | A1* | 12/2002 | Goldstein | H04L 67/22 709/224 |
| 2003/0105800 | A1* | 6/2003 | Cullen | H04L 67/10 709/201 |
| 2004/0030693 | A1 | 2/2004 | Toda et al. | |
| 2004/0117435 | A1 | 6/2004 | Rossmanith et al. | |
| 2005/0026130 | A1* | 2/2005 | Crowhurst | G09B 5/14 434/362 |
| 2007/0276671 | A1 | 11/2007 | Gudigara et al. | |
| 2013/0085996 | A1* | 4/2013 | Tian | G06F 16/27 707/648 |
| 2015/0160989 | A1* | 6/2015 | Maes | G06F 9/541 719/313 |
| 2016/0112475 | A1 | 4/2016 | Lawson et al. | |
| 2016/0127254 | A1* | 5/2016 | Kumar | H04L 41/00 709/226 |

OTHER PUBLICATIONS

U.S. Appl. No. 16/000,190, filed Jun. 5, 2018.
JBPM, "What is jBPM?," https://www.jbpm.org/, Apr. 15, 2011, 4 pages.
Wiggins A., "VI. Processes", https://12factor.net/processes, Oct. 23, 2011, 1 page.

* cited by examiner

PROCESSING AN OPERATION WITH A PLURALITY OF PROCESSING STEPS

RELATED APPLICATION

This application is a continuation of U.S. patent application Ser. No. 16/000,190, filed Jun. 5, 2018, which is incorporated herein by reference.

BACKGROUND

A process management framework provides a structure and tool for managing different process flows. The process management framework provides interactions between many different types of applications to support a process flow.

SUMMARY

According to some possible implementations, a device may include one or more memories, and one or more processors, operatively coupled to the one or more memories, to receive a request for an operation that includes a plurality of processing steps and process the request to identify metadata information. The one or more processors may determine a first processing step, of the plurality of processing steps, based on the metadata information and process the metadata information to select a first microservice, of a plurality of microservices, to call and a first transport protocol, of a plurality of transport protocols, to utilize to call the first microservice. The one or more processors may call, utilizing the first transport protocol, the first microservice to cause the first microservice to perform the first processing step, and receive, from the first microservice and based on calling the first microservice, a first output that indicates a result of the first microservice performing the first processing step. The one or more processors may determine, based on the first output and the metadata information, a second processing step of the plurality of processing steps. The one or more processors may process the first output and the metadata information to select a second microservice, of the plurality of microservices, to call and a second transport protocol, of the plurality of transport protocols, to utilize to call the second microservice, wherein the second transport protocol is different from the first transport protocol. The one or more processors may call, utilizing the second transport protocol, the second microservice to cause the second microservice to perform the second processing step, and receive, from the second microservice and based on calling the second microservice, a second output that indicates a result of the second microservice performing the second processing step. The one or more processors may provide a response to the request based on the first output and the second output.

According to some possible implementations, a non-transitory computer-readable medium may store instructions that comprise one or more instructions that, when executed by one or more processors, cause the one or more processors to receive a request for an operation that includes a plurality of processing steps and process the request to identify metadata information. The one or more instructions, when executed by the one or more processors, may cause the one or more processors to determine a first processing step, of the plurality of processing steps, based on the metadata information and process the metadata information to select a first microservice, of a plurality of microservices, to call and a first transport protocol, of a plurality of transport protocols, to utilize to call the first microservice. The one or more instructions, when executed by the one or more processors, may cause the one or more processors to send first information related to the first processing step, the first microservice, and the first transport protocol to one or more servers for storage and call, utilizing the first transport protocol, the first microservice to cause the first microservice to perform the first processing step. The one or more instructions, when executed by the one or more processors, may cause the one or more processors to receive, from the first microservice and based on calling the first microservice, a first output that indicates a result of the first microservice performing the first processing step, and determine, based on the first output and the metadata information, a second processing step of the plurality of processing steps. The one or more instructions, when executed by the one or more processors, may cause the one or more processors to process the first output and the metadata information to select a second microservice, of the plurality of microservices, to call and a second transport protocol, of the plurality of transport protocols, to utilize to call the second microservice, wherein the second transport protocol utilizes a different transmission synchronization from the first transport protocol. The one or more instructions, when executed by the one or more processors, may cause the one or more processors to send second information related to the second processing step, the second microservice, and the second transport protocol to the one or more servers for storage, and call, utilizing the second transport protocol, the second microservice to cause the second microservice to perform the second processing step. The one or more instructions, when executed by the one or more processors, may cause the one or more processors to receive, from the second microservice, and based on calling the second microservice, a second output that indicates a result of the second microservice performing the second processing step, and provide a response to the request based on the first output and the second output.

According to some possible implementations, a method may include receiving, by a server device, a request for an operation that includes a plurality of processing steps, and processing, by the server device, the request to identify metadata information. The method may include determining, by the server device, a first processing step, of the plurality of processing steps, based on the metadata information, and processing, by the server device, the metadata information to select a first microservice, of a plurality of microservices, to call and a first transport protocol, of a plurality of transport protocols, to utilize to call the first microservice. The method may include calling, by the server device and utilizing the first transport protocol, the first microservice to cause the first microservice to perform the first processing step, and receiving, by the server device, from the first microservice, and based on calling the first microservice, a first output that indicates a result of the first microservice performing the first processing step. The method may include determining, by the server device and based on the first output and the metadata information, a second processing step of the plurality of processing steps, and processing, by the server device, the first output and the metadata information to select a second microservice, of the plurality of microservices, to call and a second transport protocol, of the plurality of transport protocols, to utilize to call the second microservice, wherein the second transport protocol is different from the first transport protocol. The method may include calling, by the server device and utilizing the second transport protocol, the second microservice to cause the second microservice to perform the second processing step, and receiving, by the server device, from the second microservice, and based on calling the second microservice, a second output that indicates a result of the second microservice performing the second processing step. The method may include sending, by the server device, information related to the first output and the second output to one or more servers for storage, and providing, by the server device, a response to the request based on the first output and the second output.

DETAILED DESCRIPTION

The following detailed description of example implementations refers to the accompanying drawings. The same reference numbers in different drawings may identify the same or similar elements.

A microservices-based architecture may be used for distributed applications that handle process flows. In a microservices-based architecture, a process management framework deploys small, independent services, known as microservices, that communicate using transport protocols. However, current process management frameworks cannot handle using more than one transport protocol for microservices communication. Moreover, current process management frameworks do not provide capabilities to resume or retry a microservice, track the status of a process flow, or analyze the process management framework's performance.

Some implementations described herein provide a cloud-based process management framework that permits microservices to communicate using different transport protocols. In some implementations, the process management framework is capable of communicating with a plurality of microservices where at least one of the plurality of microservices uses a synchronous transport protocol and at least one of the plurality of microservices uses an asynchronous transport protocol. In some implementations, the process management framework provides a resume and/or retry capability for calling microservices. In some implementations, the process management framework stores information related to processing of a processing step, which allows for real-time status tracking of the processing step. In some implementations, the process management framework stores raw data related to the operation of the process management framework.

In this way, the process management framework can handle calls to an expanded universe of microservices and, thereby, provide a more robust microservice-based architecture. Some implementations described herein may reduce or eliminate duplicative job performance by multiple process management frameworks, thereby improving process flow performance. In addition, some implementations described herein may improve speed and efficiency of the process flows and conserve computing resources (e.g., processor resources, memory resources, and/or the like). Further, some implementations described herein may reduce or eliminate overloading of a process management framework, thereby improving functioning of the process management framework.

Figure 1A:
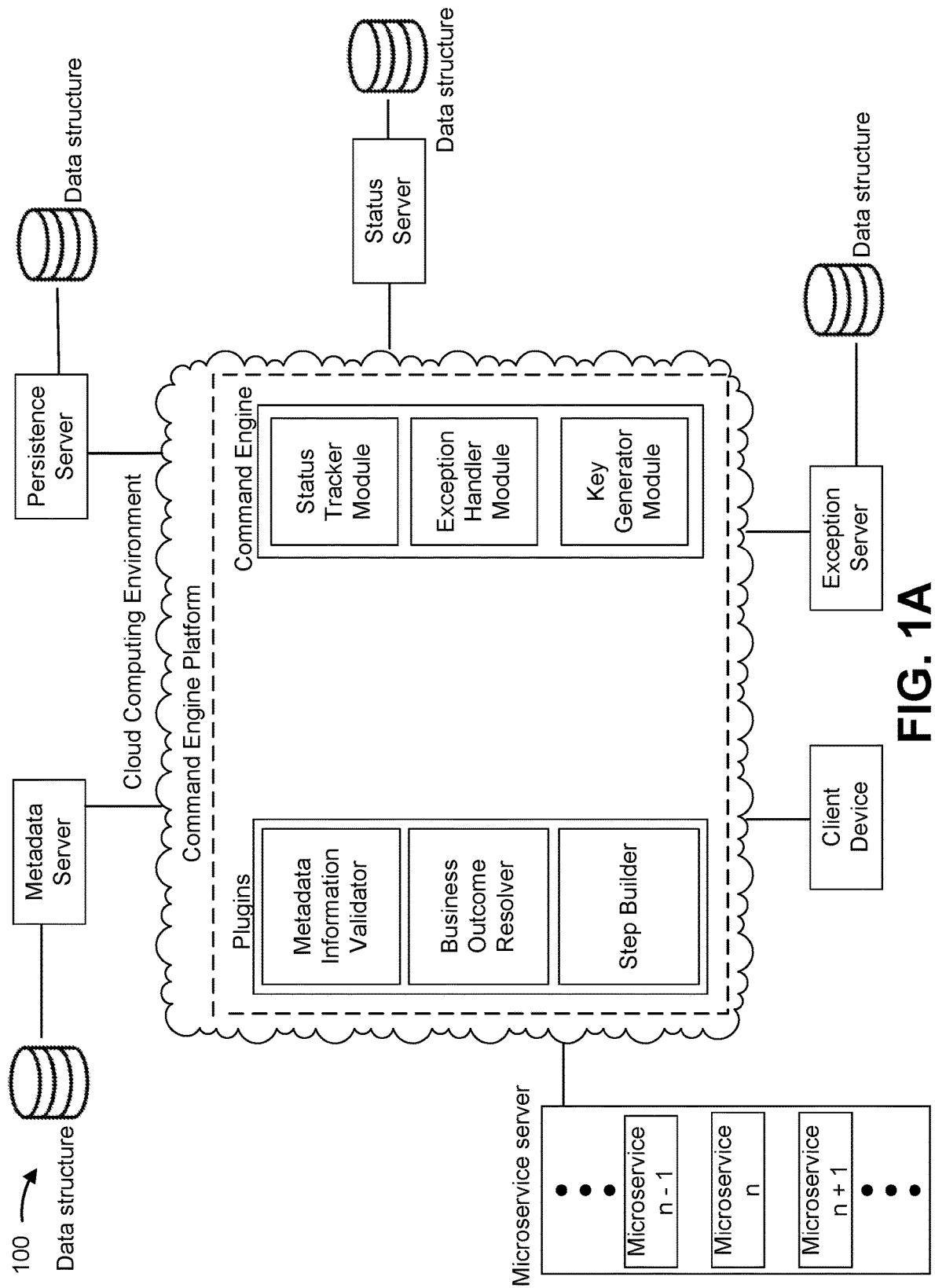
FIGS. 1A-1G are diagrams of an example implementation described herein.

FIGS. 1A-1G are diagrams of an example implementation 100 described herein. As shown in FIG. 1A, example implementation 100 may include a command engine platform, a metadata server, a persistence server, a status server, an exception server, a client device, and a microservice server. In some implementations, the command engine platform may be associated with a cloud computing environment. In some implementations, the command engine platform may include a command engine and plugins. In some implementations, the command engine may include a status tracker module, an exception handler module, and a key generator module. In some implementations, the plugins may include a metadata information validator, a business outcome resolver, and a step builder. In some implementations, the microservice server may provide access to one or more microservices. In some implementations, the metadata server, the persistence server, the status server, and the exception server are each operatively connected to a data structure.

Figure 1B:
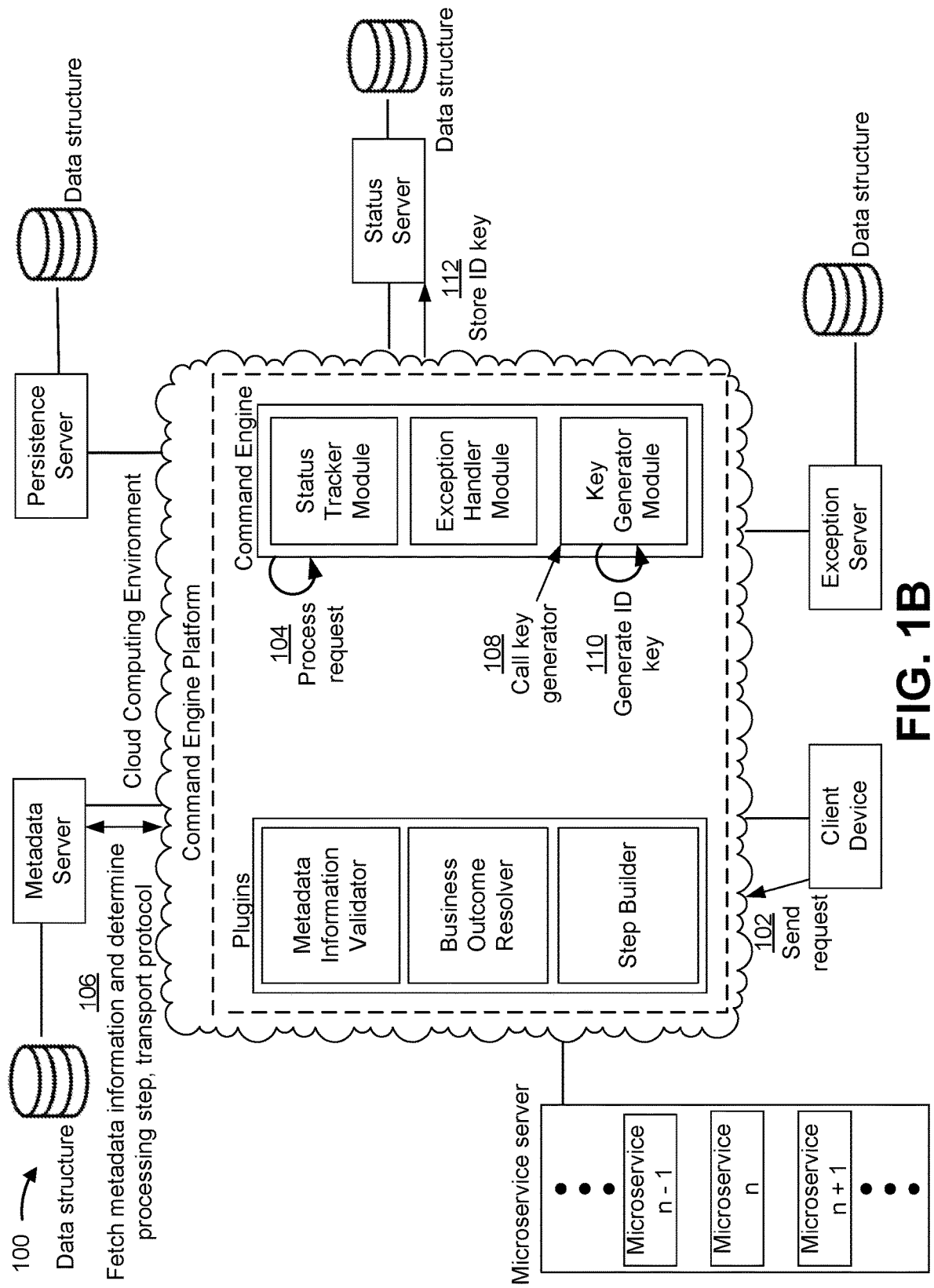

As shown in FIG. 1B, and by reference number 102, the client device may send a request to the command engine platform. In some implementations, the client device is a communication and/or computing device, such as a mobile phone, a laptop computer, a tablet computer, and/or the like. In some implementations, the client device may include one or more applications and/or processes that, when executed by one or more processors of the user device, facilitate data communications with the command engine platform. In some implementations, the request may be associated with an operation (e.g., a process flow). For example, the client device may send a request to the command engine platform asking the command engine platform to process an applicant's credit card application (referred to herein as "the credit card application scenario"), where an operation may process the credit card application.

In some implementations, the operation is associated with metadata. In some implementations, the metadata may indicate that an operation includes a plurality of processing steps. For example, in the credit card application scenario, the metadata may indicate that an operation to process the credit card application may include a plurality of processing steps, such as, verifying the applicant's identification information, performing a credit check on the applicant, verifying the authenticity of the credit card application, and/or the like.

In some implementations, each processing step, of the plurality of processing steps, is associated with metadata information, which is comprised in the metadata. In some implementations, the metadata information may conform to a human-readable or machine-readable data format, such as JavaScript Object Notation (JSON), Hypertext Markup Language (HTML), YAML Ain't Markup Language (YAML), Extensible Markup Language (XML), and/or the like. For each processing step, the metadata information may indicate a microservice that performs the processing step. For example, in the credit card application scenario, the metadata information, associated with the processing step to verify the applicant's identification information, may indicate that an identification verification microservice performs the processing step to verify the applicant's identification information, and the metadata information associated with the processing step to perform a credit check on the applicant may indicate that a credit check microservice performs the processing step to perform a credit check on the applicant.

In some implementations, the metadata information may include processing step information. The processing step information may indicate a transport protocol to be used to call the microservice that performs the processing step, an item of call information to pass to the microservice that performs the processing step, a retry rate for calling the microservice that performs the processing step, a retry period for calling the microservice that performs the processing step, one or more next processing steps, one or more next microservices that perform the one or more next processing steps, one or more transport protocols to be used to call the one or more next microservices that perform the one or more next processing steps, and/or the like. In some implementations, the transport protocol may be an asynchronous transport protocol. In some implementations, the transport protocol may be a synchronous transport protocol.

As further shown in FIG. 1B, and by reference number 104, the command engine in the command engine platform may receive the request and, based on receiving the request, process the request to determine a name of the operation. In some implementations, the command engine may utilize an event listener to listen for client device requests. The event listener may listen for the request at a transport protocol interface, where the client device sends the request, using a transport protocol, to the transport protocol interface. In some implementations, the event listener may be capable of listening for requests sent by different client devices using different transport protocols. For example, the event listener may be capable of listening for and distinguishing between requests made using a Hypertext Transfer Protocol (HTTP) and an Apache Kafka protocol (Kafka).

In some implementations, the command engine may parse the request to determine the name of the operation. In some implementations, the command engine may utilize a lookup table to determine the name of the operation. In some implementations, the command engine may parse the request using natural language processing to determine the name of operation.

As further shown in FIG. 1B, and by reference number 106, the command engine may send, based on determining the name of the operation, a query using the name of the operation to the metadata server. For example, in the credit card application scenario described herein, the command engine may send the name of the operation (e.g., to process the applicant's credit card application) to the metadata server. In some implementations, the metadata server, based on receiving the name of the operation, may send the metadata information associated with a processing step of the plurality of processing steps to the command engine. For example, the metadata server may send, in the credit card application scenario, the metadata information associated with verifying the applicant's identification information to the command engine.

In some implementations, as further shown be reference number 106, the command engine may process the metadata information to determine the processing step, the microservice that performs the processing step, and a transport protocol to use to call the microservice that performs the processing step. For example, in the credit card application scenario, the command engine may process the metadata information to determine the verifying the applicant's identification information processing step, the identification verification microservice that performs the verifying the applicant's identification information processing step, and the transport protocol for calling the identification verification microservice. In some implementations, the command engine may receive the metadata information from the metadata server, detect the format of the metadata information (e.g., JSON, HTML, YAML, XML, and/or the like), and identify, based on the detected format, the processing step, the microservice that performs the processing step, and the transport protocol. In some implementations, the command engine may call the step builder plugin to process the metadata information to determine the processing step, the microservice to call to perform the processing step, and the transport protocol.

As further shown in FIG. 1B, and by reference number 108, the command engine may call, based on determining the processing step, a key generator module. As shown by reference number 110, the key generator module may generate an identification key identifying the processing step. In some implementations, the key generator module may generate an identification key, which may be used to facilitate real-time tracking of the processing step. As shown by reference number 112, the command engine may send the identification key to a status server for storage. In some implementations, by assigning the identification key to the processing step, the command engine platform that is processing multiple requests at the same time, many of which may be associated with the same and/or similar operations and processing steps, can keep track of any individual processing step by the identification key. In this way, the command engine platform may facilitate tracking or troubleshooting of an operation and/or processing step and thereby conserve processor and/or memory resources that would otherwise be used to track or troubleshoot an operation in an inefficient manner.

In some implementations, the status server may store the identification key in a data structure, such as a database, a table, a linked-list, a tree, and/or the like. In some implementations, the data structure may be provided in a memory associated with the status server. In some implementations, the command engine may send additional information to the status server to store with the identification key, such as information concerning the processing step (e.g., the name of the processing step), information concerning the metadata information (e.g., information identifying the transport protocol), information concerning the command engine platform (e.g., information about computational resources, workload, and/or the like) and/or the like. In some implementations, the status server may store the identification key and the additional information so that the command engine platform, client device, or another device, may query the status server for real-time information about the processing step.

Figure 1C:
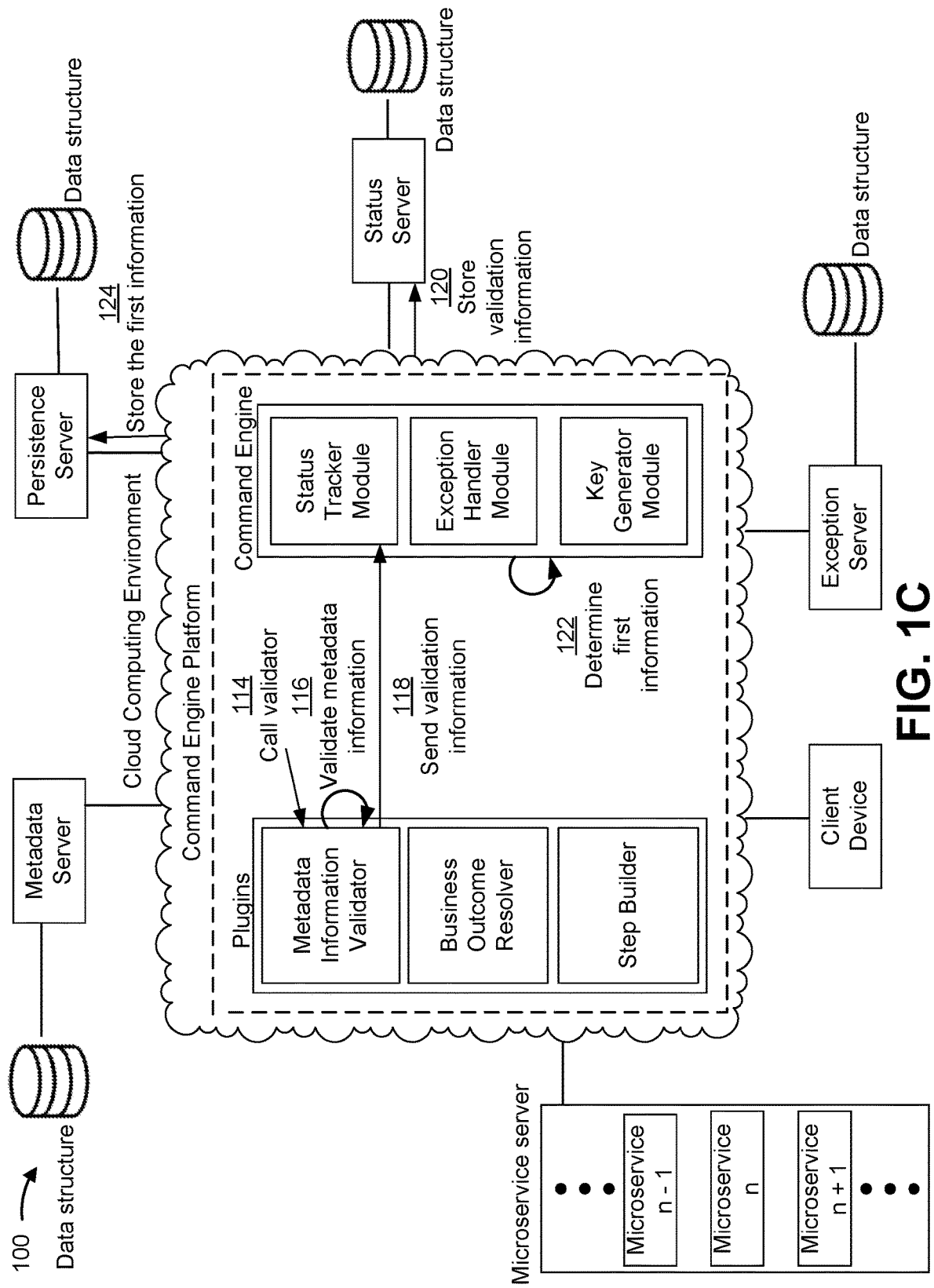

As shown in FIG. 1C, and by reference number 114, the command engine platform may call, based on determining the processing step, a metadata information validator plugin. A plugin is a software component that performs a function, task, or activity. A plugin may include a computer program, an application, a process, a service, a microservice, and/or the like. The command engine platform may comprise a plurality of plugins, where the functionality of the metadata information validator plugin may be performed by one or more of the plurality of plugins. In some implementations, the command engine may call the metadata information validator plugin to verify that the item of call information can be processed by the microservice that performs the processing step.

As shown in FIG. 1C, and by reference number 116, the metadata information validator plugin may validate the metadata information. The metadata information validator plugin may perform validation steps to ensure that the microservice that performs the processing step and the processing step information is complete, correct, and/or formatted correctly. For example, in the credit card application scenario, where the processing step is to verify the applicant's identification information, the metadata information validator plugin may check that the metadata information correctly identifies the identification verification microservice and/or contains the identification information for the identification verification microservice to process.

As shown in FIG. 1C, and by reference number 118, the metadata information validator plugin may send, based on validating the metadata information, validation information regarding the metadata information to the status tracker module in the command engine. In some implementations, the validation information may include information identifying the processing step, the microservice that performs the processing step, the item of call information, and/or an output indicating a result of the validation process (e.g., "validation complete," "validation complete with warnings," "validation failed," and/or the like). In this way, the command engine may avoid calling the microservice that performs the processing step in some situations where the microservice that performs the processing step will not run successfully, thereby reducing an amount of processing associated with calling the microservice that performs the processing step, and thereby conserving processor and/or memory resources of the command engine platform that would otherwise be used to call the microservice.

As shown in FIG. 1C, and by reference number 120, the command engine may send, based on receiving the validation information, the validation information to the status server for storage. In some implementations, the command engine may send a command to the status server to associate the validation information with the identification key when storing the validation information.

As shown in FIG. 1C, and by reference number 122, the command engine may determine, based on receiving the validation information, first information that concerns identifying a state of the processing step. In some implementations, the first information may include information concerning the validation status information. In some implementations, the first information may indicate information identifying the processing step, the microservice that performs the processing step, the transport protocol, the item of call information, the output indicating a result of the validation process (e.g., "validation complete," "validation complete with warnings," "validation failed," and/or the like), and/or the like.

As shown in FIG. 1C, and by reference number 124, the command engine may send, based on determining the first information, the first information to a persistence server for storage. The persistence server may store the first information in a data structure, such as a database, a table, a linked-list, a tree, and/or the like. In some implementations, the data structure may be provided in a memory associated with the persistence server. In some implementations, the persistence server may store the first information so that the command engine platform, the client device, or another device may run computational analytics on the performance of the command engine platform. In this way, the command engine platform's processor and memory resources may be more efficiently utilized to continue handling operations and/or processing steps.

Figure 1D:
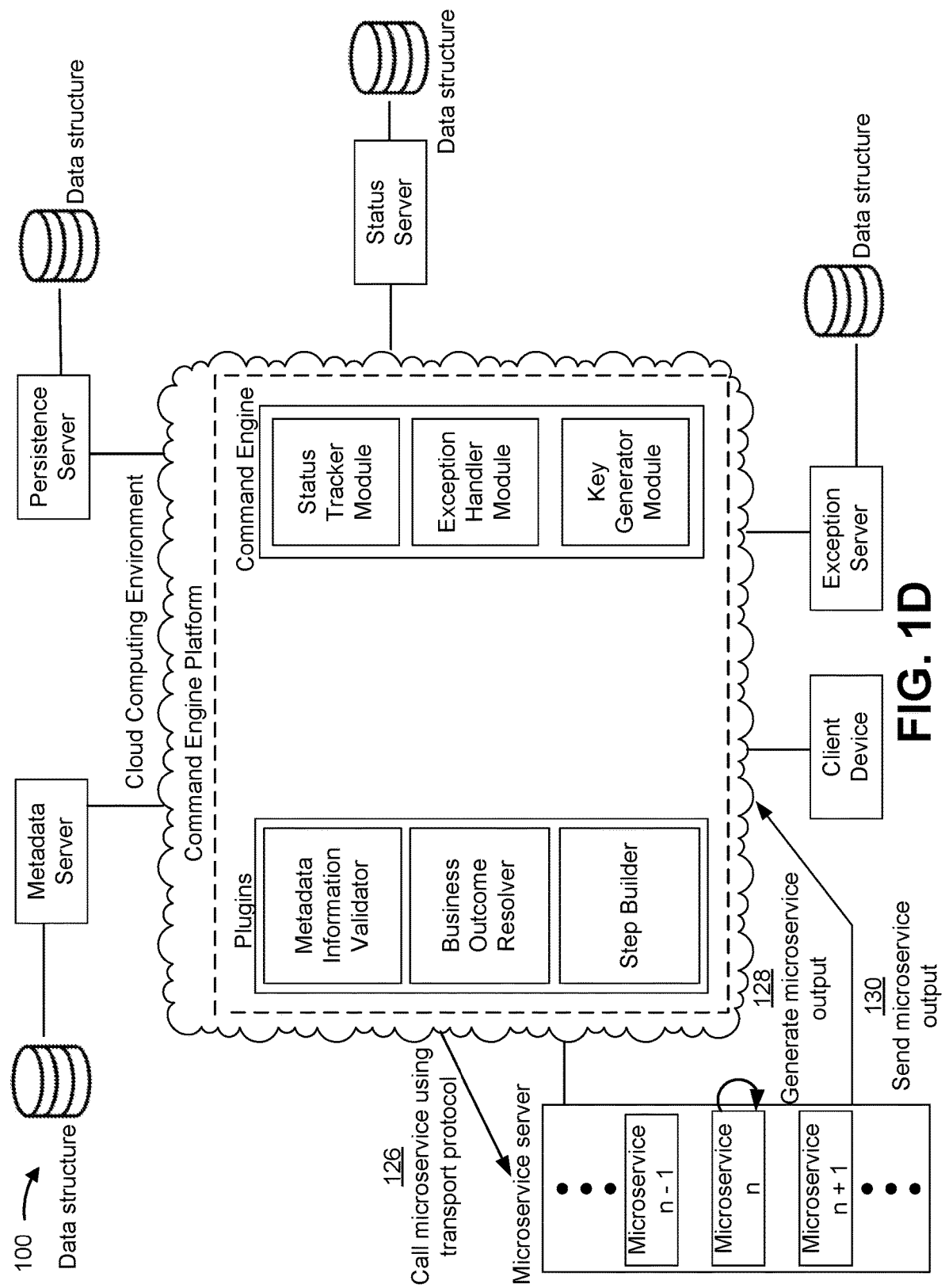

As shown in FIG. 1D, and by reference number 126, the command engine may call, based on validating the metadata information, the microservice that performs the processing step using the transport protocol. In some implementations, the command engine may also send the item of call information to the microservice that performs the processing step. For example, in the credit card application scenario, the command engine may call the identification verification microservice that performs the processing step to verify the applicant's identification information and may send identification call information (e.g., name of the applicant, applicant's address, applicant's Social Security number, and/or the like) to the identification verification microservice. In some implementations, the transport protocol may be asynchronous, such as Kafka, RabbitMQ, and/or the like. In some implementations, the transport protocol may be synchronous, such as HTTP.

As shown in FIG. 1D, and by reference number 128, the microservice that performs the processing step may run, based on being called by the microservice that performs the processing step, and generate a microservice output. In some implementations, the microservice that performs the processing step may process the item of call information to generate a microservice output. For example, in the credit card application scenario, the identification verification microservice that performs the processing step to verify the applicant's identification information may process the identification call information (e.g., name of the applicant, applicant's address, applicant's Social Security number, and/or the like) by comparing the identification call information and other information associated with the applicant that is available to the identification verification microservice. In some implementations, the microservice that performs the processing step may generate a microservice output that indicates whether the microservice that performs the processing step ran successfully or unsuccessfully. In some implementations, the microservice output may be in a computer readable and/or human readable format.

As shown in FIG. 1D, and by reference number 130, the microservice that performs the processing step sends, based on generating the microservice output, the microservice output to the command engine platform. In some implementations, the microservice server may communicate the microservice output to the command engine platform via the transport protocol. In some implementations, the transport protocol may be asynchronous, such as Kafka, RabbitMQ, and/or the like. In some implementations, the transport protocol may be synchronous, such as HTTP.

Figure 1E:
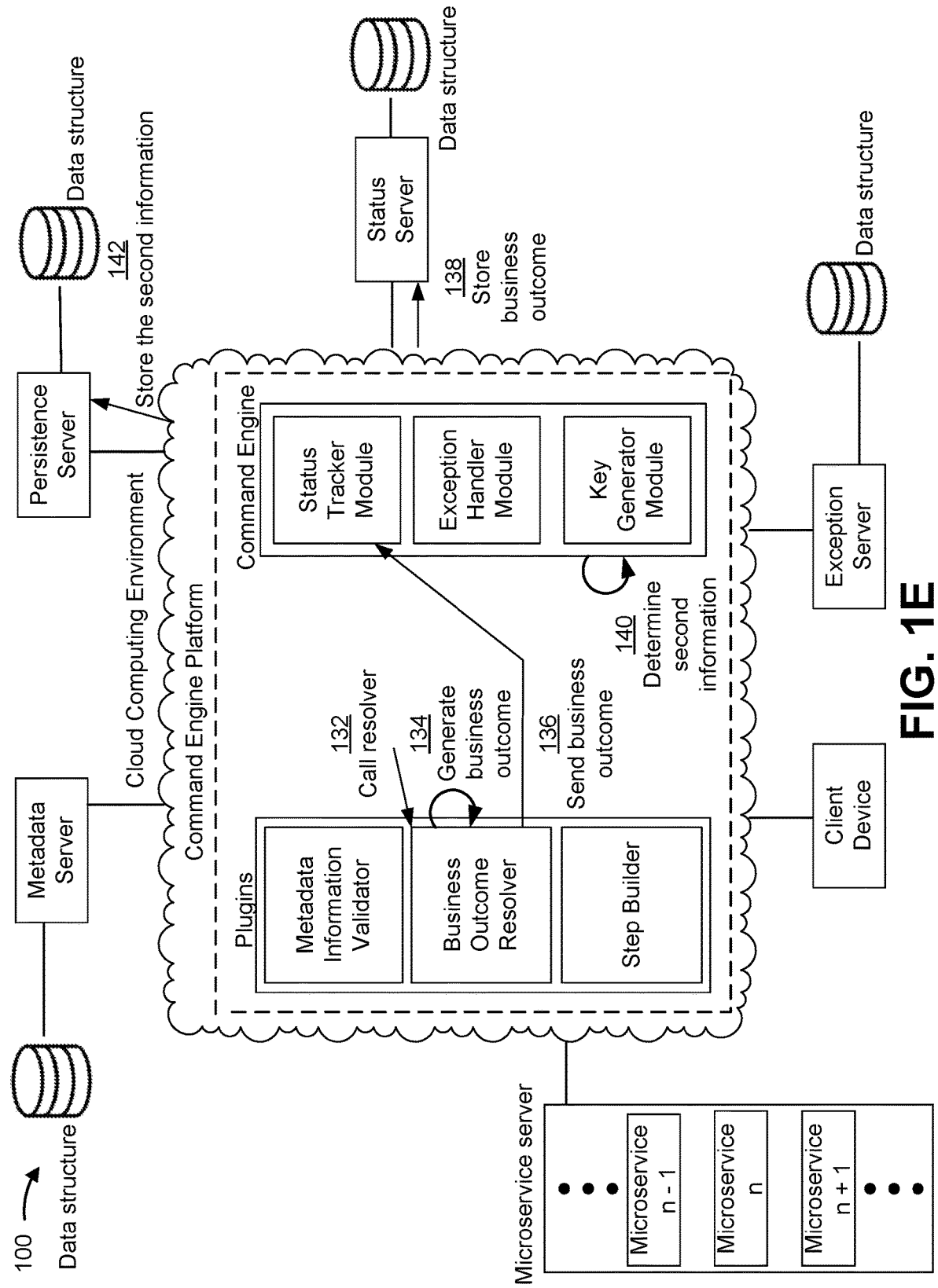

As shown in FIG. 1E, and by reference number 132, the command engine may send, based on receiving the microservice output, the microservice output to a business outcome resolver plugin. In some implementations, the functionality of the business outcome resolver plugin may be performed by one or more plugins. In some implementations, the command engine may call the business outcome resolver plugin to determine whether the microservice output is acceptable for further processing of the operation.

As shown in FIG. 1E, and by reference number 134, the business outcome resolver plugin processes the microservice output and generates a business outcome. In some implementations, the business outcome resolver may process the microservice output and generate a business outcome that indicates whether the call to the microservice that performs the processing step was successful. In some implementations, the business outcome resolver may process the microservice output using a set of rules to generate the business outcome. The set of rules may be specific to the processing step and/or the microservice that performs the processing step. For example, in the credit card application scenario, the identification verification microservice (that performs the processing step to verify the applicant's identification information) may produce a microservice output indicating that identification of the applicant failed. The business outcome resolver may then use a set of rules to generate a business outcome that indicates why the identification verification microservice failed or alternative processing steps and microservices to call to continue processing the credit card application (e.g., a processing step to get new applicant identification information using a fetch applicant identification information microservice).

In some implementations, the business outcome resolver may process the microservice output using the set of rules and determine that an exception occurred while running the microservice that performs the processing step. In some implementations, an exception may indicate that the microservice that performs the processing step failed to finish, the microservice output is corrupt and/or nonmeaningful, the microservice output indicates a runtime error, and/or the like. In some implementations, an exception may indicate that the microservice that performs the processing step may need to be run again. In some implementations, the business outcome resolver may generate the business outcome to indicate an exception. In some implementations, the business outcome may be in a natural language format that is readable and/or meaningful to a human (e.g., the business outcome may state "processing step successful," "microservice timed out," "rerun processing step," "microservice exception," and/or the like).

As shown in FIG. 1E, and by reference number 136, the business outcome resolver plugin, based on generating the business outcome, may send the business outcome to the status tracker module in the command engine. As shown in FIG. 1E, and by reference number 138, the command engine may send, based on receiving the business outcome, the business outcome to the status server for storage. In some implementations, the command engine may send a command to the status server to associate the business outcome with the identification key when storing the validation information.

As shown in FIG. 1E, and by reference number 140, the command engine may determine, based on receiving the business outcome, second information that concerns identifying a state of the processing step. In some implementations, the second information may include information concerning the business outcome. In some implementations, the second information may indicate information identifying the processing step, the microservice that performs the processing step, the item of call information, the business outcome, and/or the like.

As shown in FIG. 1E, and by reference number 142, the command engine may send, based on determining the second information, the second information to a persistence server for storage. In some implementations, the persistence server may store the second information so that the command engine platform, the client device, or another device may run computational analytics on the performance of the command engine platform.

Figure 1F:
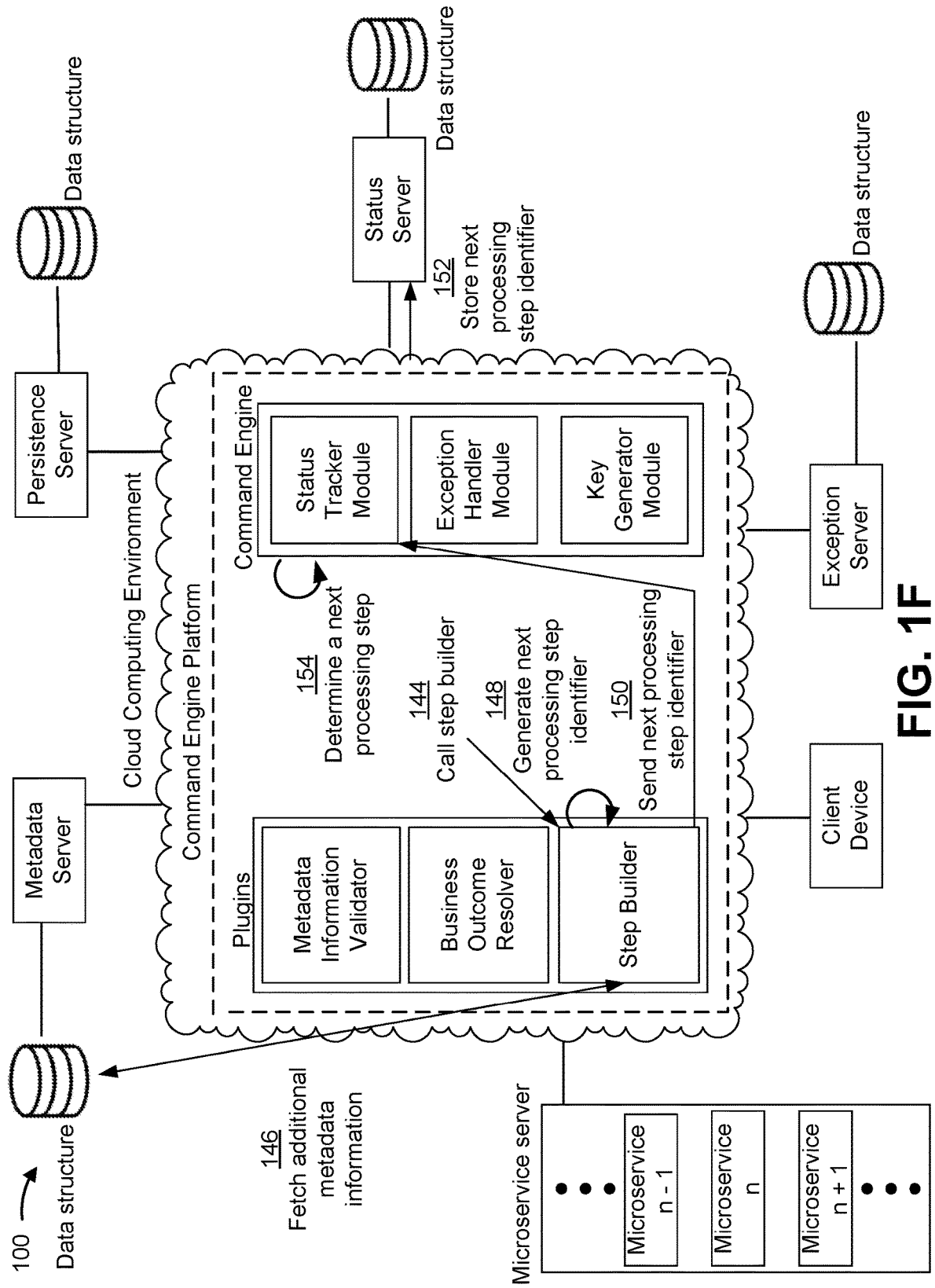

As shown in FIG. 1F, and by reference number 144, the command engine platform, based on receiving the business outcome, may call the step builder plugin. The functionality of the step builder plugin may be performed by one or more plugins. In some implementations, the command engine may call the step builder plugin to determine a next processing step identifier.

As shown in FIG. 1F, and by reference number 146, the step builder plugin may send a query to the metadata server. In some implementations, the step builder plugin may process the business outcome to generate the query to send to the metadata server. In some implementations, the step builder plugin processes the business outcome in view of the one or more next processing steps (in the processing step information of the metadata information) to determine the query. For example, in the credit card application scenario, in the case where the business outcome indicates that the identification verification microservice (that performs the processing step to verify the applicant's identification information) ran successfully, the step builder plugin may determine the query based on the one or more next processing steps that indicates the next processing step is a credit check processing step. In the case where that the identification verification microservice ran unsuccessfully, the step builder plugin may determine the query based on the one or more next processing steps that indicates, based on an unsuccessful business outcome, the next processing step is a processing step to get new applicant identification information.

As further shown by reference number 146, the metadata server, based on receiving the query, may send additional metadata information to the step builder plugin. In some implementations, the additional metadata information may conform to a human-readable or machine-readable data format, such as JSON, HTML, YAML, XML, and/or the like. The additional metadata information may indicate a next processing step and next processing step information. The next processing step may indicate a next microservice that performs the next processing step and the next processing step information may indicate a next transport protocol to call the next microservice, a next item of call information to pass to the next microservice that performs the next processing step, and/or the like.

As shown in FIG. 1F, and by reference number 148, the step builder plugin may determine the next processing step identifier based on the additional metadata information. In some implementations, the step builder plugin may receive the additional metadata information from the metadata server, detect the format of the additional metadata information (e.g., JSON, HTML, YAML, XML, and/or the like), and identify, based on the detected format, the next processing step, the next microservice that performs the next processing step, and the next transport protocol, and/or the like. In some implementations, the next transport protocol is different than the transport protocol. In some implementations, the next transport protocol utilizes a different transmission synchronization from the transport protocol.

As shown in FIG. 1F, and by reference number 150, the step builder plugin, based on determining the next processing step identifier, may send the next processing step identifier to the status tracker module in the command engine. As shown in FIG. 1F, and by reference number 152, the command engine, based on receiving the next processing step identifier, may send the next processing step identifier to the status server for storage. In some implementations, the command engine may send a command to the status server to associate the next processing step identifier with the identification key when storing the next processing step identifier.

As shown in FIG. 1F, and by reference number 154, the command engine may determine the next processing step based on the next processing step identifier. In some implementations, the command engine may determine the next processing step in a similar manner to that described elsewhere herein (see, e.g., the description accompanying FIG. 1A). In some implementations, the command engine facilitates performance of the next processing step in a similar manner to that described elsewhere herein (see, e.g., the description accompanying FIGS. 1A-1F).

In some implementations, the command engine platform may send a response to the request to the client device, where the response is based on output from the microservice that performs the processing step and output from the next microservice that performs the next processing step. For example, in the credit card application scenario, the command platform may run the identification verification microservice that performs the processing step to verify the applicant's identification information and the credit check microservice that performs the processing step to perform a credit check on the applicant, where output from each microservice indicates success. The command platform may then may send a response to the client device that indicates the operation to process an applicant's credit application was successful.

In some implementations, the next processing step is associated with a next microservice (that performs the next processing step) that is different from the microservice (that performs the processing step). In some implementations, the next processing step is associated with a next transport protocol that is different from the transport protocol (that is associated with the processing step). In some implementations, the next processing step is associated with a next transport protocol that utilizes a different transmission synchronization from the transport protocol (that is associated with the processing step).

Figure 1G:
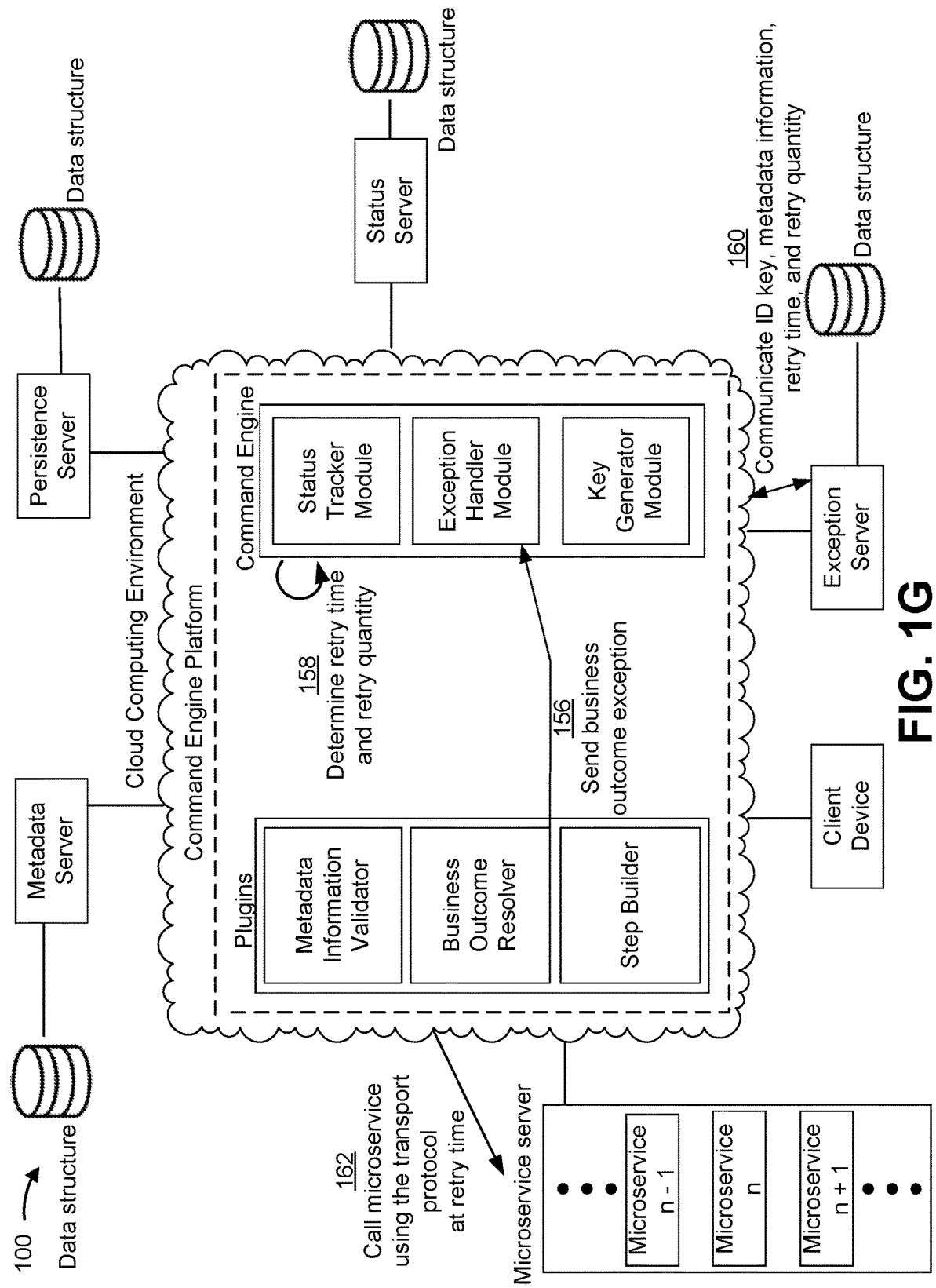

In the case where the business outcome indicates an exception, the command engine platform provides additional functionality. As shown in FIG. 1G, and by reference number 156, the business outcome resolver may process the microservice output and determine that an exception occurred while running the microservice that performs the processing step. The business outcome resolver may then send the business outcome that indicates an exception to the exception handler module in the command engine.

As shown in FIG. 1G, and by reference number 158, the exception handler module, based on receiving the business outcome that indicates an exception, may process the business outcome and determine a retry time for calling the microservice that performs the processing step and a retry quantity for calling the microservice that performs the processing step. In some implementations, the exception handler module may determine the retry time and the retry quantity based on the command engine's current or future work load. For example, the exception handler may analyze the command engine's workload queue, which may contain information concerning operations and/or processing steps that the command engine is currently handling or scheduled to handle, and determine a retry time for a time when the command engine has optimal availability.

In some implementations, the exception handler module may determine the retry time and the retry quantity based on the metadata information. In some implementations, the exception handler module may determine the retry time based on the metadata information's processing step information, which may indicate the retry rate for calling the microservice that performs the processing step and/or the retry period for calling the microservice that performs the processing step. In some implementations, the exception handler module may determine the retry quantity based on the metadata information's processing step information, which may indicate the retry rate for calling the microservice that performs the processing step and/or the retry period for calling the microservice that performs the processing step. In some implementations, the exception handler module may create a schedule, based on the retry time and retry quantity, for calling the microservice that performs the processing step.

In some implementations, the exception handler may determine a retry rate related to the microservice that performs the processing step and a retry period related to the microservice that performs the processing step in a similar manner to that described for determining the retry time and the retry quantity. In some implementations, the exception handler module may create a schedule, based on the retry rate related to the microservice that performs the processing step and the retry period related to the microservice that performs the processing step, to call the microservice that performs the processing step.

As shown in FIG. 1G, and by reference number 160, the command engine platform may communicate with the exception server to facilitate determining the retry rate and the retry quantity, and calling the microservice that performs the processing step. The command engine may send the ID key, metadata information, retry time, retry quantity, and/or the like to the exception server for storage. The exception server may store the ID key, metadata information, retry time, retry quantity, and/or the like in a data structure, such as a database, a table, a linked-list, a tree, and/or the like. In some implementations, the data structure may be provided in a memory associated with the exception server. In some implementations, the exception handler module and exception server may communicate to update the retry time and retry quantity. For example, the exception handler may decrease the retry quantity each time the microservice that performs the processing step is called and runs unsuccessfully. If the retry quantity decreases to zero, the microservice that performs the processing step may not be scheduled to be called again.

As shown in FIG. 1G, and by reference number 162, the command engine platform calls the microservice that performs the processing step using the transport schedule at the retry time. In some implementations, the command engine may call the microservice in accordance with the schedule. In some implementations, the command engine may call the microservice at the retry time.

As indicated above, FIGS. 1A-1G are provided merely as examples. Other examples are possible and may differ from what was described with regard to FIGS. 1A-1G.

Figure 2:
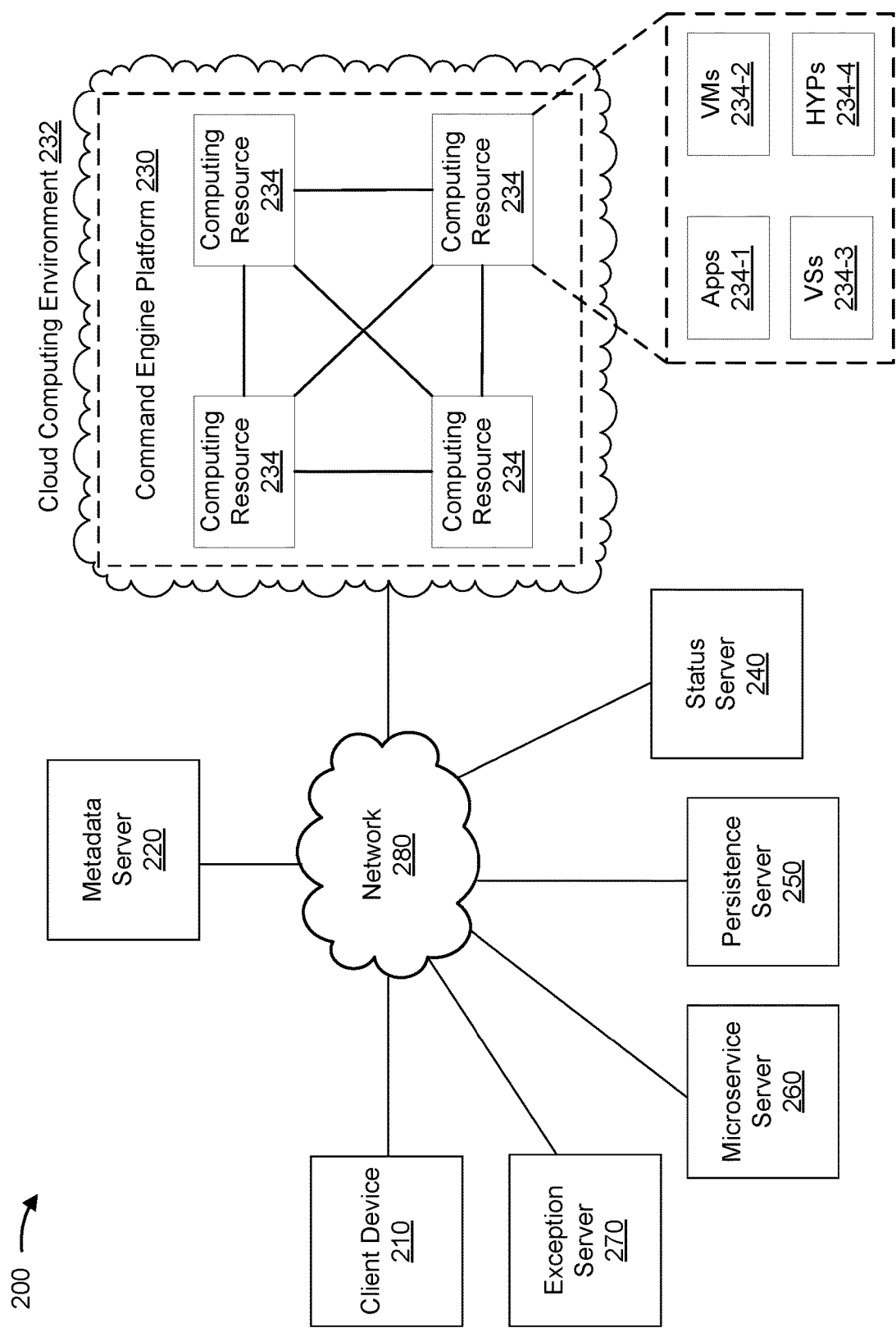
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a metadata server 220, a command engine platform 230, a status server 240, a persistence server 250, a microservice server 260, an exception server 270, and a network 280. Devices of environment 200 may interconnect via wired connections, wireless connections, or a combination of wired and wireless connections.

Client device 210 includes one or more devices capable of receiving, generating, storing, processing, and/or providing information associated with sending a request to command engine platform 230 to perform an operation. For example, client device 210 may include a desktop computer, a mobile phone (e.g., a smart phone, a radiotelephone, and/or the like), a laptop computer, a tablet computer, a handheld computer, a gaming device, a virtual reality device, a wearable communication device (e.g., a smart wristwatch, a pair of smart eyeglasses, and/or the like), or a similar type of device. In some implementations, client device 210 may receive, and output for display, information related to sending a request to command engine platform 230 to perform an operation, as described elsewhere herein.

Metadata server 220 includes one or more devices capable of storing, processing, and/or routing information associated with metadata related to an operation. For example, metadata server 220 may include a server device or a group of server devices. In some implementations, metadata server 220 may include a communication interface that allows metadata server 220 to receive information from and/or transmit information to other devices in environment 200.

Command engine platform 230 includes one or more devices capable of receiving, generating, storing, processing, and/or providing information associated with performing an operation. For example, command engine platform 230 may include a cloud server or a group of cloud servers. In some implementations, command engine platform 230 may be designed to be modular such that certain software components can be swapped in or out depending on a particular need. As such, command engine platform 230 may be easily and/or quickly reconfigured for different uses.

In some implementations, as shown, command engine platform 230 may be hosted in cloud computing environment 232. Notably, while implementations described herein describe command engine platform 230 as being hosted in cloud computing environment 232, in some implementations, command engine platform 230 may not be cloud-based (i.e., may be implemented outside of a cloud computing environment) or may be partially cloud-based.

Cloud computing environment 232 includes an environment that hosts command engine platform 230. Cloud computing environment 232 may provide computation, software, data access, storage, and/or other services that do not require end-user knowledge of a physical location and configuration of a system and/or a device that hosts command engine platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host command engine platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of example environment 200. Application 234-1 may eliminate a need to install and execute the software applications on devices of example environment 200. For example, application 234-1 may include software associated with command engine platform 230 and/or any other software capable of being provided via cloud computing environment 232. In some implementations, application 234-1 may include a plugin, such as the metadata information validator plugin, business outcome resolver plugin, and step builder plugin, as described elsewhere herein, and/or the like. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like. In some implementations, application 234-1 may include a command engine module, such as the status tracker module, exception handler module, and key generator module, as described elsewhere herein, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems and may manage the execution of the guest operating systems. Multiple instances of a variety of operating systems may share virtualized hardware resources.

Status server 240 includes one or more devices capable of storing, processing, and/or routing information associated with tracking the status of a processing step. For example, status server 240 may include a server device or a group of server devices. In some implementations, status server 240 may include a communication interface that allows status server 240 to receive information from and/or transmit information to other devices in environment 200.

Persistence server 250 includes one or more devices capable of storing, processing, and/or routing information associated with performance of the command engine. For example, persistence server 250 may include a server device or a group of server devices. In some implementations, persistence server 250 may include a communication interface that allows persistence server 250 to receive information from and/or transmit information to other devices in environment 200.

Microservice server 260 includes one or more devices capable of storing, processing, and/or routing information associated with microservices that can be called by the command engine. For example, microservice server 260 may include a server device or a group of server devices. In some implementations, microservice server 260 may include a communication interface that allows microservice server 260 to receive information from and/or transmit information to other devices in environment 200.

Exception server 270 includes one or more devices capable of storing, processing, and/or routing information associated with microservices that can be called by the command engine. For example, exception server 270 may include a server device or a group of server devices. In some implementations, exception server 270 may include a communication interface that allows exception server 270 to receive information from and/or transmit information to other devices in environment 200.

Network 280 includes one or more wired and/or wireless networks. For example, network 280 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
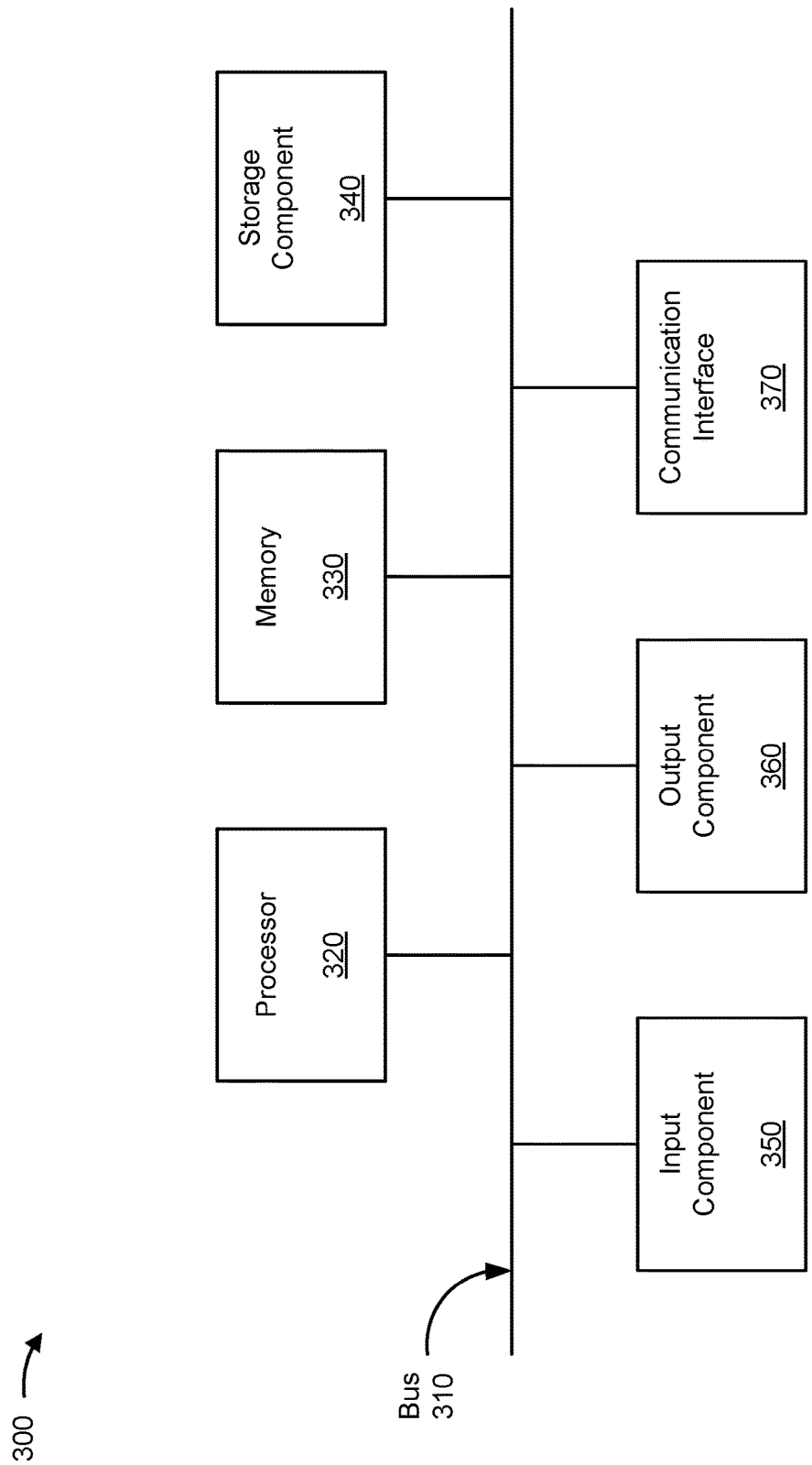
FIG. 3 is a diagram of example components of one or more devices of FIG. 2.

FIG. 3 is a diagram of example components of a device 300. Device 300 may correspond to client device 210, metadata server 220, command engine platform 230, status server 240, persistence server 250, microservice server 260, and/or exception server 270. In some implementations, client device 210, metadata server 220, command engine platform 230, status server 240, persistence server 250, microservice server 260, and/or exception server 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
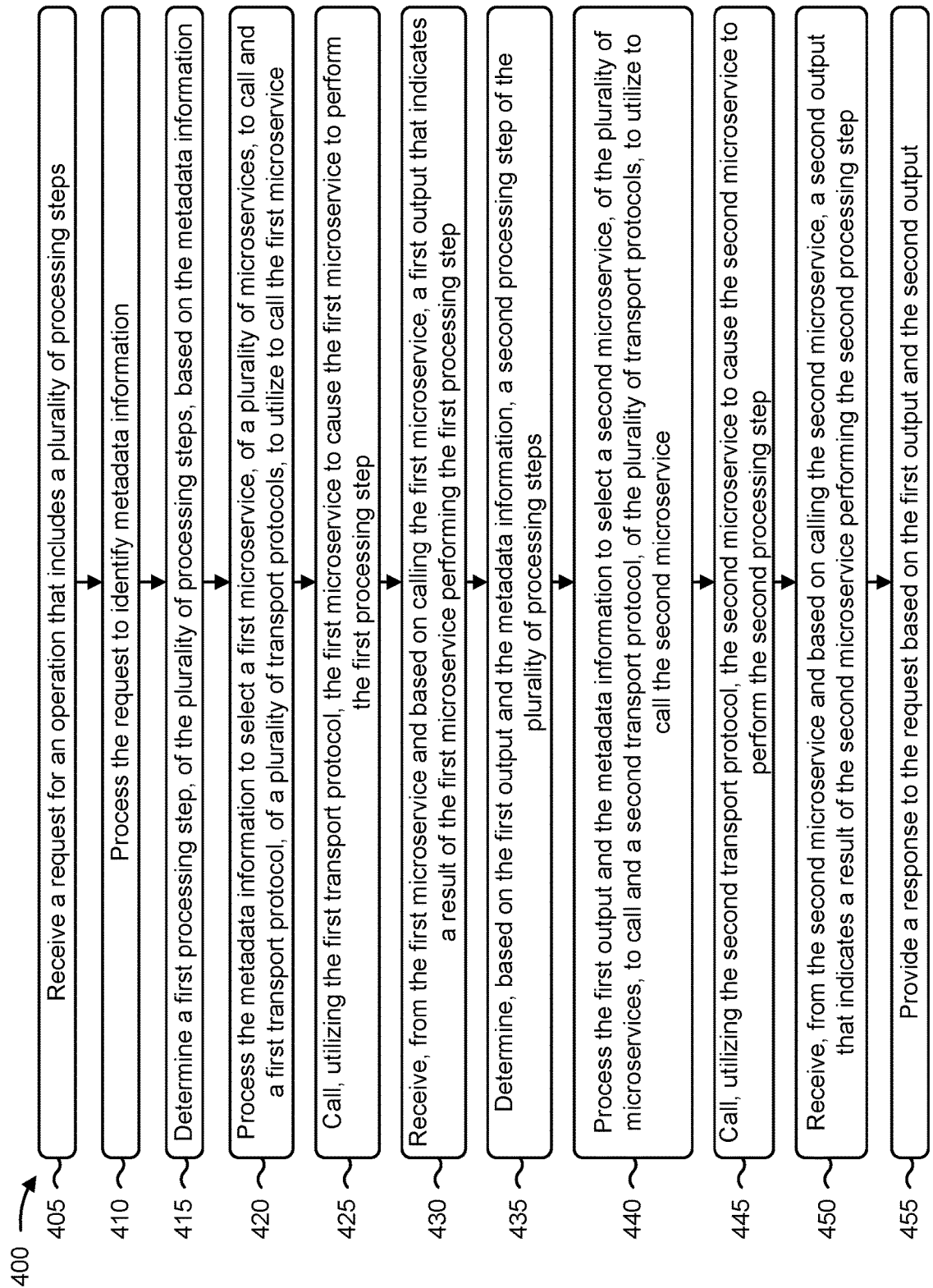
FIGS. 4-6 are flow charts of example processes for processing an operation with a plurality of processing steps.

FIG. 4 is a flow chart of an example process 400 for performing an operation. In some implementations, one or more process blocks of FIG. 4 may be performed by a command engine platform (e.g., command engine platform 230). In some implementations, one or more process blocks of FIG. 4 may be performed by another device or a group of devices separate from or including the command engine platform, such as a client device (e.g., client device 210), a metadata server (e.g., metadata server 220), a status server (e.g., status server 240), a persistence server (e.g., persistence server 250), a microservice server (e.g., microservice server 260), and an exception server (e.g., exception server 270).

As shown in FIG. 4, process 400 may include receiving a request for an operation that includes a plurality of processing steps (block 405). For example, the command engine platform (e.g., using computing resource 234, processor 320, memory 330, input component 350, communication interface 370, and/or the like) may receive a request for an operation that includes a plurality of processing steps, as described above in connection with FIGS. 1A-1G.

As further shown in FIG. 4, process 400 may include processing the request to identify metadata information (block 410). For example, the command engine platform (e.g., using computing resource 234, processor 320, memory 330, input component 350, output component 360, communication interface 370, and/or the like) may process the request to identify metadata information, as described above in connection with FIGS. 1A-1G.

As further shown in FIG. 4, process 400 may include determining a first processing step, of the plurality of processing steps, based on the metadata information (block 415). For example, the command engine platform (e.g., using computing resource 234, processor 320, memory 330, storage component 340, and/or the like) may determine a processing step (e.g., the first processing step), of the plurality of processing steps, based on the metadata information, as described above in connection with FIGS. 1A-1G.

As further shown in FIG. 4, process 400 may include processing the metadata information to select a first microservice, of a plurality of microservices, to call and a first transport protocol, of a plurality of transport protocols, to utilize to call the first microservice (block 420). For example, the command engine platform (e.g., using computing resource 234, processor 320, memory 330, storage component 340, and/or the like) may process the metadata information to select a microservice that performs the processing step (e.g., the first microservice), of a plurality of microservices, to call and a transport protocol (e.g., the first transport protocol), of a plurality of transport protocols, to utilize to call the microservice that performs the processing step (e.g., the first microservice), as described above in connection with FIGS. 1A-1G.

As further shown in FIG. 4, process 400 may include calling, utilizing the first transport protocol, the first microservice to cause the first microservice to perform the first processing step (block 425). For example, the command engine platform (e.g., using computing resource 234, processor 320, memory 330, output component 360, communication interface 370, and/or the like) may call, utilizing the transport protocol (e.g., the first transport protocol), the microservice that performs the processing step (e.g., the first microservice) to cause the microservice that performs the processing step (e.g., the first microservice) to perform the processing step (e.g., the first processing step), as described above in connection with FIGS. 1A-1G.

As further shown in FIG. 4, process 400 may include receiving, from the first microservice and based on calling the first microservice, a first output that indicates a result of the first microservice performing the first processing step (block 430). For example, the command engine platform (e.g., using computing resource 234, processor 320, memory 330, input component 350, communication interface 370, and/or the like) may receive, from the microservice that performs the processing step (e.g., the first microservice) and based on calling the microservice that performs the processing step (e.g., the first microservice), a microservice output (e.g., a first output) that indicates a result of the microservice that performs the processing step (e.g., the first microservice) performing the processing step (e.g., the first processing step), as described above in connection with FIGS. 1A-1G.

As further shown in FIG. 4, process 400 may include determining, based on the first output and the metadata information, a second processing step of the plurality of processing steps (block 435). For example, the command engine platform (e.g., using computing resource 234, processor 320, memory 330, storage component 340, input component 350, output component 360, communication interface 370, and/or the like) may determine, based on the microservice output (e.g., the first output) and the metadata information, a next processing step (e.g., a second processing step) of the plurality of processing steps, as described above in connection with FIGS. 1A-1G.

As further shown in FIG. 4, process 400 may include processing the first output and the metadata information to select a second microservice, of the plurality of microservices, to call and a second transport protocol, of the plurality of transport protocols, to utilize to call the second microservice (block 440). For example, the command engine platform (e.g., using computing resource 234, processor 320, memory 330, storage component 340, and/or the like) may include processing the microservice output (e.g., the first output) and the metadata information to select a next microservice that performs the next processing step (e.g., a second microservice), of the plurality of microservices, to call and a next transport protocol (e.g., a second transport protocol), of the plurality of transport protocols, to utilize to call the next microservice that performs the next processing step (e.g., the second microservice), as described above in connection with FIGS. 1A-1G. In some implementations, the second transport protocol is different from the first transport protocol.

As further shown in FIG. 4, process 400 may include calling, utilizing the second transport protocol, the second microservice to cause the second microservice to perform the second processing step (block 445). For example, the command engine platform (e.g., using computing resource 234, processor 320, memory 330, output component 360, communication interface 370, and/or the like) may call, utilizing the next transport protocol (e.g., the second transport protocol), the next microservice that performs the next processing step (e.g., second microservice) to cause the next microservice that performs the next processing step (e.g., the second microservice) to perform the next processing step (e.g., the second processing step), as described above in connection with FIGS. 1A-1G.

As further shown in FIG. 4, process 400 may include receiving, from the second microservice and based on calling the second microservice, a second output that indicates a result of the second microservice performing the second processing step (block 450). For example, the command engine platform (e.g., using computing resource 234, processor 320, memory 330, input component 350, communication interface 370, and/or the like) may receive, from the next microservice that performs the next processing step (e.g., the second microservice) and based on calling the next microservice that performs the next processing step (e.g., the second microservice), a next microservice output (e.g., a second output) that indicates a result of the next microservice that performs the next processing step (e.g., the second microservice) performing the next processing step (e.g., the second processing step), as described above in connection with FIGS. 1A-1G.

As further shown in FIG. 4, process 400 may include providing a response to the request based on the first output and the second output (block 455). For example, the command engine platform (e.g., using computing resource 234, processor 320, memory 330, output component 360, communication interface 370, and/or the like) may provide a response to the request based on the microservice output (e.g., the first output) and the next microservice output (e.g., the second output), as described above in connection with FIGS. 1A-1G.

Process 400 may include additional implementations, such as any single implementation or any combination of implementations described below and/or in connection with one or more other processes described elsewhere herein.

In some implementations, the first microservice is different from the second microservice. In some implementations, the metadata information includes first data that identifies the first processing step, second data that identifies the second processing step, third data that identifies the first microservice, and fourth data that identifies the second microservice. In some implementations, the command engine platform may call a plugin, of a plurality of plugins, to cause the plugin to validate at least one of the first data, the second data, the third data, or the fourth data.

In some implementations, the command engine platform may call a first plugin, of a plurality of plugins, to cause the first plugin to validate the first data and the third data; receive, from the first plugin and based on calling the first plugin, a first signal that indicates validity of the first data and the third data; send the first signal to one or more servers for storage; call a second plugin, of the plurality of plugins, to cause the second plugin to evaluate the first output; receive, from the second plugin and based on calling the second plugin, a first outcome related to the first processing step; send the first outcome to the one or more servers for storage; call a third plugin, of the plurality of plugins, to cause the third plugin to validate the second data and the fourth data; receive, from the third plugin and based on calling the third plugin, a second signal that indicates validity of the second data and the fourth data; send the second signal to the one or more servers for storage; call a fourth plugin, of the plurality of plugins, to cause the fourth plugin to evaluate the second output; receive, from the fourth plugin and based on calling the fourth plugin, a second outcome related to the second processing step; and send the second outcome to the one or more servers for storage.

In some implementations, the command engine platform may call a plugin, of a plurality of plugins, to cause the plugin to evaluate the first output, and receive, from the plugin and based on calling the plugin, an outcome that indicates that an exception has occurred related to the first processing step. In some implementations, the command engine platform may determine, based on the outcome, a retry rate related to the first processing step; determine, based on the outcome, a retry period related to the first processing step; and create a schedule, based on the retry rate and retry period, to call, utilizing the first transport protocol, the first microservice to cause the first microservice to perform the first processing step.

In some implementations, the first transport protocol is synchronous and the second transport protocol is asynchronous. In some implementations, the first transport protocol is asynchronous and the second transport protocol is synchronous.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
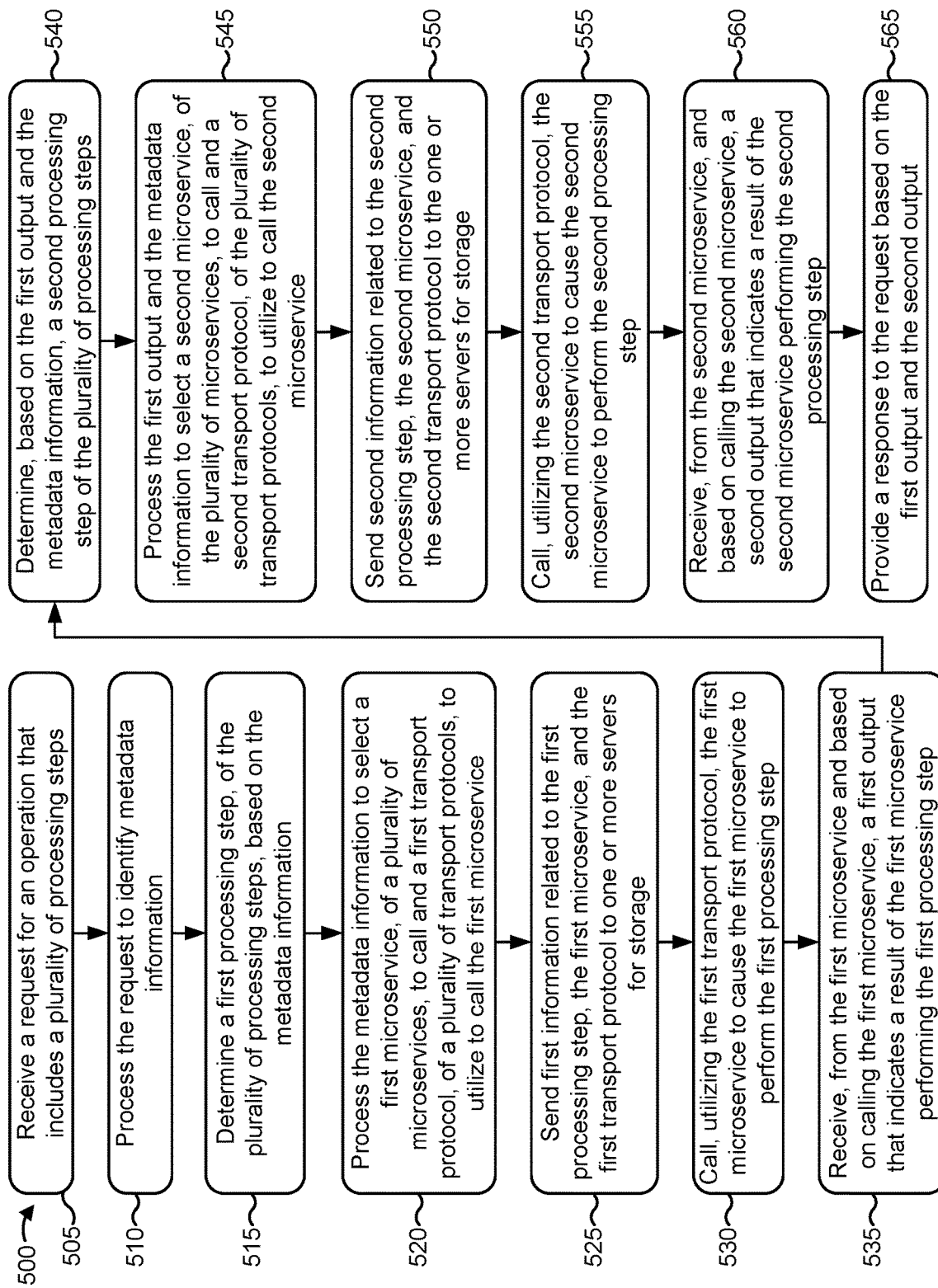

FIG. 5 is a flow chart of an example process 500 for performing an operation. In some implementations, one or more process blocks of FIG. 5 may be performed by a command engine platform (e.g., command engine platform 230). In some implementations, one or more process blocks of FIG. 5 may be performed by another device or a group of devices separate from or including the command engine platform, such as a client device (e.g., client device 210), a metadata server (e.g., metadata server 220), a status server (e.g., status server 240), a persistence server (e.g., persistence server 250), a microservice server (e.g., microservice server 260), and an exception server (e.g., exception server 270).

As shown in FIG. 5, process 500 may include receiving a request for an operation that includes a plurality of processing steps (block 505). For example, the command engine platform (e.g., using computing resource 234, processor 320, memory 330, input component 350, communication interface 370, and/or the like) may receive a request for an operation that includes a plurality of processing steps, as described above in connection with FIGS. 1A-1G.

As further shown in FIG. 5, process 500 may include processing the request to identify metadata information (block 510). For example, the command engine platform (e.g., using computing resource 234, processor 320, memory 330, input component 350, output component 360, communication interface 370, and/or the like) may process the request to identify metadata information, as described above in connection with FIGS. 1A-1G.

As further shown in FIG. 5, process 500 may include determining a first processing step, of the plurality of processing steps, based on the metadata information (block 515). For example, the command engine platform (e.g., using computing resource 234, processor 320, memory 330, storage component 340, and/or the like) may determine a processing step (e.g., the first processing step), of the plurality of processing steps, based on the metadata information, as described above in connection with FIGS. 1A-1G.

As further shown in FIG. 5, process 500 may include processing the metadata information to select a first microservice, of a plurality of microservices, to call and a first transport protocol, of a plurality of transport protocols, to utilize to call the first microservice (block 520). For example, the command engine platform (e.g., using computing resource 234, processor 320, memory 330, storage component 340, and/or the like) may process the metadata information to select a microservice that performs the processing step (e.g., the first microservice), of a plurality of microservices, to call and a transport protocol (e.g., the first transport protocol), of a plurality of transport protocols, to utilize to call the microservice that performs the processing step (e.g., the first microservice), as described above in connection with FIGS. 1A-1G.

As further shown in FIG. 5, process 500 may include sending first information related to the first processing step, the first microservice, and the first transport protocol to one or more servers for storage (block 525). For example, the command engine platform (e.g., using computing resource 234, processor 320, memory 330, output component 360, communication interface 370, and/or the like) may send first information that concerns identifying a state of the processing step (e.g., the first information related to the first processing step), the microservice that performs the processing step (e.g., the first microservice), and the transport protocol (e.g., the first transport protocol) to the persistence server (e.g., the one or more servers) for storage, as described above in connection with FIGS. 1A-1G.

As further shown in FIG. 5, process 500 may include calling, utilizing the first transport protocol, the first microservice to cause the first microservice to perform the first processing step (block 530). For example, the command engine platform (e.g., using computing resource 234, processor 320, memory 330, output component 360, communication interface 370, and/or the like) may call, utilizing the transport protocol (e.g., the first transport protocol), the microservice that performs the processing step (e.g., the first microservice), to cause the microservice that performs the processing step (e.g., the first microservice) to perform the processing step (e.g., the first processing step), as described above in connection with FIGS. 1A-1G.

As further shown in FIG. 5, process 500 may include receiving, from the first microservice and based on calling the first microservice, a first output that indicates a result of the first microservice performing the first processing step (block 535). For example, the command engine platform (e.g., using computing resource 234, processor 320, memory 330, input component 350, communication interface 370, and/or the like) may receive, from the microservice that performs the processing step (e.g., the first microservice) and based on calling the microservice that performs the processing step (e.g., the first microservice), a microservice output (e.g., a first output) that indicates a result of the microservice that performs the processing step (e.g., the first microservice) performing the processing step (e.g., the first processing step), as described above in connection with FIGS. 1A-1G.

As further shown in FIG. 5, process 500 may include determining, based on the first output and the metadata information, a second processing step of the plurality of processing steps (block 540). For example, the command engine platform (e.g., using computing resource 234, processor 320, memory 330, storage component 340, input component 350, output component 360, communication interface 370, and/or the like) may determine, based on the microservice output (e.g., the first output) and the metadata information, a next processing step (e.g., a second processing step) of the plurality of processing steps, as described above in connection with FIGS. 1A-1G.

As further shown in FIG. 5, process 500 may include processing the first output and the metadata information to select a second microservice, of the plurality of microservices, to call and a second transport protocol, of the plurality of transport protocols, to utilize to call the second microservice (block 545). For example, the command engine platform (e.g., using computing resource 234, processor 320, memory 330, storage component 340, and/or the like) may include processing the microservice output (e.g., the first output) and the metadata information to select a next microservice that performs the next processing step (e.g., a second microservice), of the plurality of microservices, to call and a next transport protocol (e.g., a second transport protocol), of the plurality of transport protocols, to utilize to call the next microservice that performs the next processing step (e.g., the second microservice), as described above in connection with FIGS. 1A-1G. In some implementations, the second transport protocol utilizes a different transmission synchronization from the first transport protocol.

As further shown in FIG. 5, process 500 may include sending second information related to the second processing step, the second microservice, and the second transport protocol to the one or more servers for storage (block 550). For example, the command engine platform (e.g., using computing resource 234, processor 320, memory 330, output component 360, communication interface 370, and/or the like) may send second information related to the next processing step (e.g., the second information related to the second processing step), the next microservice that performs the next processing step (e.g., the second microservice), and the next transport protocol (e.g., the second transport protocol) to the persistence server (e.g., the one or more servers) for storage, as described above in connection with FIGS. 1A-1G.

As further shown in FIG. 5, process 500 may include calling, utilizing the second transport protocol, the second microservice to cause the second microservice to perform the second processing step (block 555). For example, the command engine platform (e.g., using computing resource 234, processor 320, memory 330, output component 360, communication interface 370, and/or the like) may call, utilizing the next transport protocol (e.g., the second transport protocol), the next microservice that performs the next processing step (e.g., the second microservice) to cause the next microservice that performs the next processing step (e.g., the second microservice) to perform the next processing step (e.g., the second processing step), as described above in connection with FIGS. 1A-1G.

As further shown in FIG. 5, process 500 may include receiving, from the second microservice and based on calling the second microservice, a second output that indicates a result of the second microservice performing the second processing step (block 560). For example, the command engine platform (e.g., using computing resource 234, processor 320, memory 330, input component 350, communication interface 370, and/or the like) may receive, from the next microservice that performs the next processing step (e.g., the second microservice) and based on calling the next microservice that performs the next processing step (e.g., the second microservice), a next microservice output (e.g., a second output) that indicates a result of the next microservice that performs the next processing step (e.g., the second microservice) performing the next processing step (e.g., the second processing step), as described above in connection with FIGS. 1A-1G.

As further shown in FIG. 5, process 500 may include providing a response to the request based on the first output and the second output (block 565). For example, the command engine platform (e.g., using computing resource 234, processor 320, memory 330, output component 360, communication interface 370, and/or the like) may provide a response to the request based on the microservice output (e.g., the first output) and the next microservice output (e.g., the second output), as described above in connection with FIGS. 1A-1G.

Process 500 may include additional implementations, such as any single implementation or any combination of implementations described below and/or in connection with one or more other processes described elsewhere herein.

In some implementations, the first microservice is different from the second microservice. In some implementations, the metadata information includes first data that identifies the first processing step, second data that identifies the second processing step, third data that identifies the first microservice, fourth data that identifies the second microservice, fifth data that identifies a retry rate related to retrying the first processing step, and sixth data that identifies a retry period related to retrying the first processing step. In some implementations, the command engine platform 230 may call a plugin, of a plurality of plugins, to cause the plugin to validate at least one of the first data, the second data, the third data, the fourth data, the fifth data, or the sixth data.

In some implementations, the command engine platform 230 may call a plugin, of a plurality of plugins, to cause the plugin to evaluate the first output, and receive, from the plugin and based on calling the plugin, a determination that indicates that an error has occurred related to the first processing step. In some implementations, the command engine platform 230 may determine, based on the determination that indicates that an error has occurred and the metadata information, a retry time related to the first processing step; determine, based on the determination that indicates that an error has occurred and the metadata information, a retry quantity related to the first processing step; and create a schedule, based on the retry time and the retry quantity, for calling, utilizing the first transport protocol, the first microservice to cause the first microservice to perform the first processing step.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
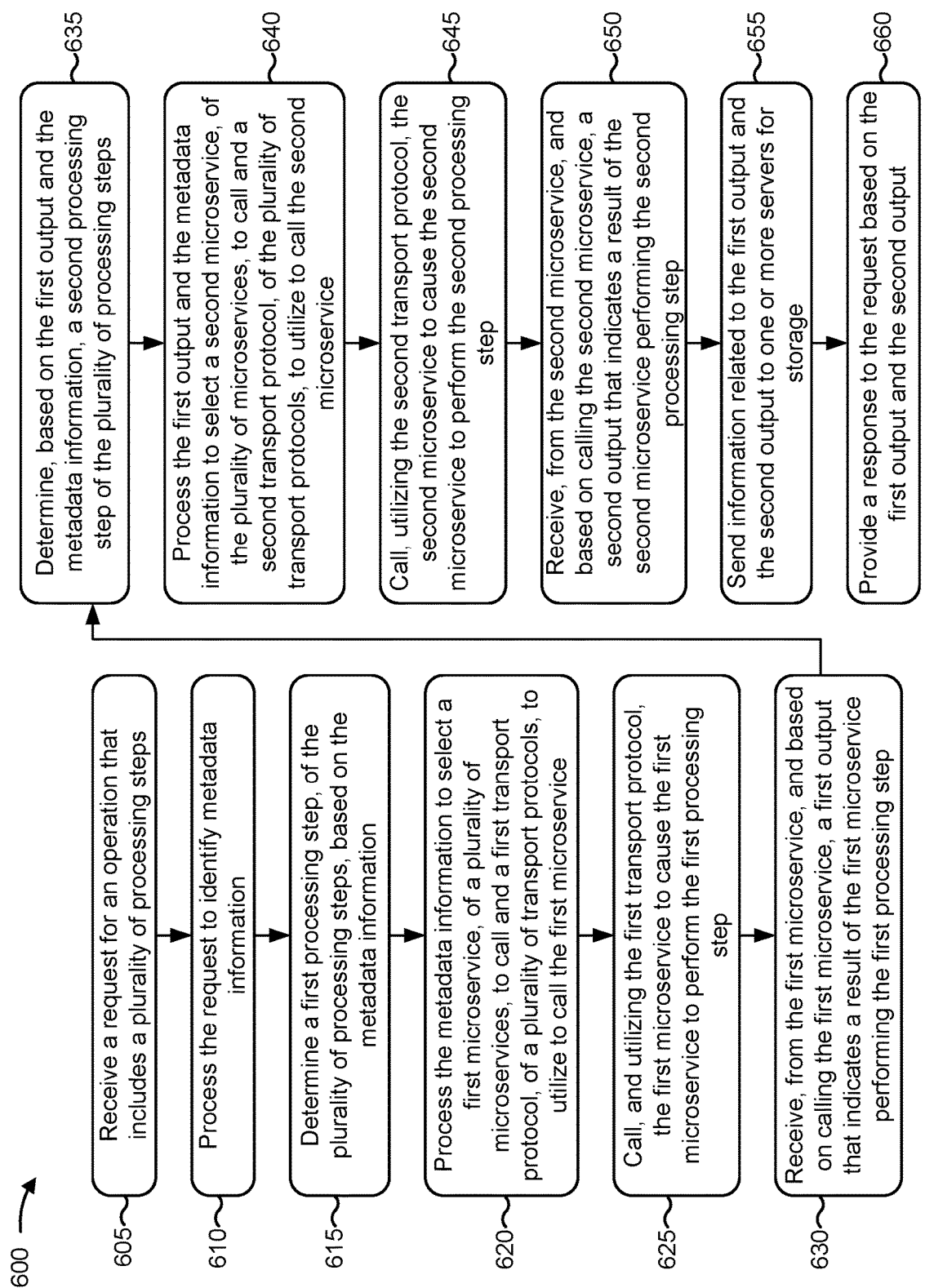

FIG. 6 is a flow chart of an example process 600 for performing an operation. In some implementations, one or more process blocks of FIG. 6 may be performed by a command engine platform (e.g., command engine platform 230). In some implementations, one or more process blocks of FIG. 6 may be performed by another device or a group of devices separate from or including the command engine platform, such as a client device (e.g., client device 210), a metadata server (e.g., metadata server 220), a status server (e.g., status server 240), a persistence server (e.g., persistence server 250), a microservice server (e.g., microservice server 260), and an exception server (e.g., exception server 270).

As shown in FIG. 6, process 600 may include receiving a request for an operation that includes a plurality of processing steps (block 605). For example, the command engine platform (e.g., using computing resource 234, processor 320, memory 330, input component 350, communication interface 370, and/or the like) may receive a request for an operation that includes a plurality of processing steps, as described above in connection with FIGS. 1A-1G.

As further shown in FIG. 6, process 600 may include processing the request to identify metadata information (block 610). For example, the command engine platform (e.g., using computing resource 234, processor 320, memory 330, input component 350, output component 360, communication interface 370, and/or the like) may process the request to identify metadata information, as described above in connection with FIGS. 1A-1G.

As further shown in FIG. 6, process 600 may include determining a first processing step, of the plurality of processing steps, based on the metadata information (block 615). For example, the command engine platform (e.g., using computing resource 234, processor 320, memory 330, storage component 340, and/or the like) may determine a processing step (e.g., the first processing step), of the plurality of processing steps, based on the metadata information, as described above in connection with FIGS. 1A-1G.

As further shown in FIG. 6, process 600 may include processing the metadata information to select a first microservice, of a plurality of microservices, to call and a first transport protocol, of a plurality of transport protocols, to utilize to call the first microservice (block 620). For example, the command engine platform (e.g., using computing resource 234, processor 320, memory 330, storage component 340, and/or the like) may process the metadata information to select a microservice that performs the processing step (e.g., the first microservice), of a plurality of microservices, to call and a transport protocol (e.g., the first transport protocol), of a plurality of transport protocols, to utilize to call the microservice that performs the processing step (e.g., the first microservice), as described above in connection with FIGS. 1A-1G.

As further shown in FIG. 6, process 600 may include calling, utilizing the first transport protocol, the first microservice to cause the first microservice to perform the first processing step (block 625). For example, the command engine platform (e.g., using computing resource 234, processor 320, memory 330, output component 360, communication interface 370, and/or the like) may call, utilizing the transport protocol (e.g., the first transport protocol), the microservice that performs the processing step (e.g., the first microservice), to cause the microservice that performs the processing step (e.g., the first microservice) to perform the processing step (e.g., the first processing step), as described above in connection with FIGS. 1A-1G.

As further shown in FIG. 6, process 600 may include receiving, from the first microservice and based on calling the first microservice, a first output that indicates a result of the first microservice performing the first processing step (block 630). For example, the command engine platform (e.g., using computing resource 234, processor 320, memory 330, input component 350, communication interface 370, and/or the like) may receive, from the microservice that performs the processing step (e.g., the first microservice) and based on calling the microservice that performs the processing step (e.g., the first microservice), a microservice output (e.g., a first output) that indicates a result of the microservice that performs the processing step (e.g., the first microservice) performing the processing step (e.g., the first processing step), as described above in connection with FIGS. 1A-1G.

As further shown in FIG. 6, process 600 may include determining, based on the first output and the metadata information, a second processing step of the plurality of processing steps (block 635). For example, the command engine platform (e.g., using computing resource 234, processor 320, memory 330, storage component 340, input component 350, output component 360, communication interface 370, and/or the like) may determine, based on the microservice output (e.g., the first output) and the metadata information, a next processing step (e.g., a second processing step) of the plurality of processing steps, as described above in connection with FIGS. 1A-1G.

As further shown in FIG. 6, process 600 may include processing the first output and the metadata information to select a second microservice, of the plurality of microservices, to call and a second transport protocol, of the plurality of transport protocols, to utilize to call the second microservice (block 640). For example, the command engine platform (e.g., using computing resource 234, processor 320, memory 330, storage component 340, and/or the like) may include processing the microservice output (e.g., the first output) and the metadata information to select a next microservice that performs the next processing step (e.g., a second microservice), of the plurality of microservices, to call and a next transport protocol (e.g., a second transport protocol), of the plurality of transport protocols, to utilize to call the next microservice that performs the next processing step (e.g., the second microservice), as described above in connection with FIGS. 1A-1G. In some implementations, the second transport protocol is different from the first transport protocol.

As further shown in FIG. 6, process 600 may include calling, utilizing the second transport protocol, the second microservice to cause the second microservice to perform the second processing step (block 645). For example, the command engine platform (e.g., using computing resource 234, processor 320, memory 330, output component 360, communication interface 370, and/or the like) may call, utilizing the next transport protocol (e.g., the second transport protocol), the next microservice that performs the next processing step (e.g., second microservice) to cause the next microservice that performs the next processing step (e.g., the second microservice) to perform the next processing step (e.g., the second processing step), as described above in connection with FIGS. 1A-1G.

As further shown in FIG. 6, process 600 may include receiving, from the second microservice and based on calling the second microservice, a second output that indicates a result of the second microservice performing the second processing step (block 650). For example, the command engine platform (e.g., using computing resource 234, processor 320, memory 330, input component 350, communication interface 370, and/or the like) may receive, from the next microservice that performs the next processing step (e.g., the second microservice) and based on calling the next microservice that performs the next processing step (e.g., the second microservice), a next microservice output (e.g., a second output) that indicates a result of the next microservice that performs the next processing step (e.g., the second microservice) performing the next processing step (e.g., the second processing step), as described above in connection with FIGS. 1A-1G.

As further shown in FIG. 6, process 600 may include sending information related to the first output and the second output to one or more servers for storage (block 655). For example, the command engine platform (e.g., using computing resource 234, processor 320, memory 330, output component 360, communication interface 370, and/or the like) may send a business outcome related to the microservice output and a next microservice output (e.g., information related to the first output and the second output) to the status server (e.g., the one or more servers) for storage.

As further shown in FIG. 6, process 600 may include providing a response to the request based on the first output and the second output (block 660). For example, the command engine platform (e.g., using computing resource 234, processor 320, memory 330, output component 360, communication interface 370, and/or the like) may provide a response to the request based on the microservice output (e.g., the first output) and the next microservice output (e.g., the second output), as described above in connection with FIGS. 1A-1G.

Process 600 may include additional implementations, such as any single implementation or any combination of implementations described below and/or in connection with one or more other processes described elsewhere herein.

In some implementations, the first transport protocol has a different transmission synchronization from the second transport protocol. In some implementations, the first microservice is different from the second microservice.

In some implementations, the command engine platform may generate an identification key identifying the first processing step and sending the identification key to the one or more servers for storage in association with the information related to the first output and the second output.

In some implementations, the command engine platform may determine, based on the first output, that an exception has occurred related to the first processing step. In some implementations, the command engine platform may determine a retry time for reattempting the first processing step, and call, utilizing the first transport protocol and at the retry time, the first microservice to cause the first microservice to perform the first processing step.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein enable a command engine platform to communicate with different microservices using different transport protocols. In some implementations described herein, the command engine platform communicates with different microservices using transport protocols with different transmission synchronizations. In this way, the command engine platform can communicate with any type of microservice and thereby support any operation and/or processing step. Accordingly, the command engine platform can handle a broader universe of operation requests and therefore the need for numerous, specialized command engine platforms is reduced. In this way, some implementations described herein may conserve processor and/or memory resources of the command engine platform and/or other associated devices.

Some implementations described herein allow the command engine platform to provide a retry functionality for calling microservices that failed to run successfully. In this way, some implementations described herein enable the command engine platform to try accomplishing any particular processing step again, which increases the command engine platform's overall success rate for performing an operation. Some implementations described herein enable real-time status tracking of process flows and analysis of the command engine platform's performance. In this way, some implementations described herein may reduce the need of a device to monitor the command engine platform's performance, thereby conserving processing and/or memory resources of the device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a server device, a request for an operation;
    processing, by the server device and based on calling a first plugin, metadata information associated with the request to determine a first processing step, a first microservice that performs the first processing step, and a first transport protocol to be used to call the first microservice;
    calling, by the server device, a second plugin for validating the metadata information;
    calling, by the server device and based on the second plugin validating the metadata information, the first microservice utilizing the first transport protocol to cause the first microservice to perform the first processing step;
    receiving, by the server device, from the first microservice, and based on calling the first microservice, a first output that indicates a result of the first microservice performing the first processing step;
    sending, by the server device, the first output to a third plugin to cause the third plugin to evaluate the first output;
    calling, by the server device and based on receiving a second output from the third plugin, the first plugin to process the second output and identify a second processing step and a second transport protocol associated with the second processing step;
    calling, by the server device and utilizing the second transport protocol, a second microservice to cause the second microservice to perform the second processing step;
    receiving, by the server device, from the second microservice, and based on calling the second microservice, a third output that indicates a result of the second microservice performing the second processing step;
    sending, by the server device, information related to the first output and the third output to one or more servers for storage; and
    providing, by the server device, a response to the request based on the first output and the third output.

2. The method of claim 1, further comprising:
    calling, based on determining the first processing step, a key generator,
        the key generator generating an identification key identifying the first processing step; and
    tracking the first processing step using the identification key.

3. The method of claim 1, further comprising:
    receiving, from the second plugin, validation information identifying at least one of:
        the first processing step,
        the first microservice, or
        a fourth output indicating a result of validating the metadata information; and
    wherein calling the first microservice comprises:
        calling the first microservice based on receiving the validation information.

4. The method of claim 1, further comprising:
    calling, based on determining the first processing step, a key generator,
        the key generator generating an identification key identifying the first processing step;
    sending the identification key to a status server for tracking the first processing step;
    receiving the second output from the third plugin; and
    sending the second output to the status server to associate the second output with the identification key.

5. The method of claim 1, further comprising:
    determining that an exception occurred based on the second output; and
    determining a retry time and a retry quantity for calling the first microservice based on determining that the exception occurred.

6. The method of claim 5, further comprising:
    analyzing a workload queue; and
    wherein determining the retry time comprises:
        determining the retry time based on analyzing the workload queue.

7. The method of claim 5, wherein determining the retry time and the retry quantity comprises:
    determining the retry time and the retry quantity based on the metadata information.

8. A server device, comprising:
    one or more memories; and
    one or more processors coupled to the one or more memories, configured to:
        receive a request for an operation;
        process, based on calling a first plugin, metadata information associated with the request to determine a first processing step, a first microservice that performs the first processing step, and a first transport protocol to be used to call the first microservice;
        call a second plugin for validating the metadata information;
        call, based on the second plugin validating the metadata information, the first microservice utilizing the first transport protocol to cause the first microservice to perform the first processing step;

receive, from the first microservice and based on calling the first microservice, a first output that indicates a result of the first microservice performing the first processing step;

send the first output to a third plugin to cause the third plugin to evaluate the first output;

call, based on receiving a second output from the third plugin, the first plugin to process the second output and identify a second processing step and a second transport protocol associated with the second processing step;

call, utilizing the second transport protocol, a second microservice to cause the second microservice to perform the second processing step;

receive, from the second microservice and based on calling the second microservice, a third output that indicates a result of the second microservice performing the second processing step;

send information related to the first output and the third output to one or more servers for storage; and provide a response to the request based on the first output and the third output.

9. The server device of claim 8, wherein the one or more processors are further configured to:

call, based on determining the first processing step, a key generator, the key generator generating an identification key identifying the first processing step; and track the first processing step using the identification key.

10. The server device of claim 8, wherein the one or more processors are further configured to:

receive, from the second plugin, validation information identifying at least one of:
the first processing step,
the first microservice, or
a fourth output indicating a result of validating the metadata information; and wherein the one or more processors, when calling the first microservice, are configured to:
call the first microservice based on receiving the validation information.

11. The server device of claim 8, wherein the one or more processors are further configured to:

call, based on determining the first processing step, a key generator, the key generator generating an identification key identifying the first processing step;

send the identification key to a status server for tracking the first processing step;

receive the second output from the third plugin; and send the second output to the status server to associate the second output with the identification key.

12. The server device of claim 8, wherein the one or more processors are further configured to:

determine that an exception occurred based on the second output; and determine a retry time and a retry quantity for calling the first microservice based on determining that the exception occurred.

13. The server device of claim 12, wherein the one or more processors are further configured to:

analyze a workload queue; and wherein the one or more processors, when determining the retry time, are configured to:
determine the retry time based on analyzing the workload queue.

14. The server device of claim 12, wherein the one or more processors, when determining the retry time and the retry quantity, are configured to:
determine the retry time and the retry quantity based on the metadata information.

15. A non-transitory computer-readable medium storing instructions, the instructions comprising:

one or more instructions that, when executed by one or more processors, cause the one or more processors to:
receive a request for an operation;

process, based on calling a first plugin, metadata information associated with the request to determine a first processing step, a first microservice that performs the first processing step, and a first transport protocol to be used to call the first microservice;

call a second plugin for validating the metadata information;

call, based on the second plugin validating the metadata information, the first microservice utilizing the first transport protocol to cause the first microservice to perform the first processing step;

receive, from the first microservice and based on calling the first microservice, a first output that indicates a result of the first microservice performing the first processing step;

send the first output to a third plugin to cause the third plugin to evaluate the first output;

call, based on receiving a second output from the third plugin, the first plugin to process the second output and identify a second processing step and a second transport protocol associated with the second processing step;

call, utilizing the second transport protocol, a second microservice to cause the second microservice to perform the second processing step;

receive, from the second microservice and based on calling the second microservice, a third output that indicates a result of the second microservice performing the second processing step;

send information related to the first output and the third output to one or more servers for storage; and provide a response to the request based on the first output and the third output.

16. The non-transitory computer-readable medium of claim 15, wherein the one or more instructions, when executed by the one or more processors, further cause the one or more processors to:

call, based on determining the first processing step, a key generator, the key generator generating an identification key identifying the first processing step; and track the first processing step using the identification key.

17. The non-transitory computer-readable medium of claim 15, wherein the one or more instructions, when executed by the one or more processors, further cause the one or more processors to:

receive, from the second plugin, validation information identifying at least one of:
the first processing step,
the first microservice, or
a fourth output indicating a result of validating the metadata information; and wherein the one or more instructions, that cause the one or more processors to call the first microservice, cause the one or more processors to:
call the first microservice based on receiving the validation information.

18. The non-transitory computer-readable medium of claim 15, wherein the one or more instructions, when executed by the one or more processors, further cause the one or more processors to:
 call, based on determining the first processing step, a key generator,
  the key generator generating an identification key identifying the first processing step;
 send the identification key to a status server for tracking the first processing step;
 receive the second output from the third plugin; and
 send the second output to the status server to associate the second output with the identification key.

19. The non-transitory computer-readable medium of claim 15, wherein the one or more instructions, when executed by the one or more processors, further cause the one or more processors to:
 determine that an exception occurred based on the second output; and
 determine a retry time and a retry quantity for calling the first microservice based on determining that the exception occurred.

20. The non-transitory computer-readable medium of claim 19, wherein the one or more instructions, when executed by the one or more processors, further cause the one or more processors to:
 analyze a workload queue; and
 wherein the one or more instructions, that cause the one or more processors to determine the retry time, cause the one or more processors to:
  determine the retry time based on analyzing the workload queue.

\* \* \* \* \*